(12) United States Patent
Venkataramani

(10) Patent No.: US 9,436,441 B1
(45) Date of Patent: Sep. 6, 2016

(54) SYSTEMS AND METHODS FOR HARDWARE RESOURCE SHARING

(71) Applicant: The MathWorks, Inc., Natick, MA (US)

(72) Inventor: Girish Venkataramani, Boston, MA (US)

(73) Assignee: The MathWorks, Inc., Natick, MA (US)

(*) Notice: Subject to any disclaimer, the term of this patent is extended or adjusted under 35 U.S.C. 154(b) by 14 days.

(21) Appl. No.: 14/098,016

(22) Filed: Dec. 5, 2013

Related U.S. Application Data

(60) Provisional application No. 61/790,848, filed on Mar. 15, 2013, provisional application No. 61/733,553, filed on Dec. 5, 2012.

(51) Int. Cl.
*G06F 9/44* (2006.01)

(52) U.S. Cl.
CPC ........................... *G06F 8/34* (2013.01)

(58) Field of Classification Search
CPC ............ G06F 8/34–8/355; G06F 5/16; G06F 9/3891; G06F 9/44563
USPC .................................. 717/104–113
See application file for complete search history.

(56) References Cited

U.S. PATENT DOCUMENTS

| | | | |
|---|---|---|---|
| 5,164,724 A | 11/1992 | Hartley et al. | |
| 5,701,294 A | 12/1997 | Ward et al. | |
| 5,764,951 A | 6/1998 | Ly et al. | |
| 5,920,711 A | 7/1999 | Seawright et al. | |
| 5,923,653 A | 7/1999 | Denton | |
| 5,956,674 A | 9/1999 | Smyth et al. | |
| 6,118,902 A | 9/2000 | Knowles | |
| 6,128,025 A | 10/2000 | Bright et al. | |
| 6,216,252 B1 | 4/2001 | Dangelo et al. | |
| 6,505,339 B1 | 1/2003 | Miller et al. | |

(Continued)

FOREIGN PATENT DOCUMENTS

WO    WO 2008033344 A2 * 3/2008 ......... G06F 17/5045

OTHER PUBLICATIONS

Simulink® 7 User's Guide—Matlab & Simulink—The MathWorks—Mar. 2010.*

(Continued)

*Primary Examiner* — Francisco Aponte
(74) *Attorney, Agent, or Firm* — Cesari and McKenna, LLP; Michael R. Reinemann

(57) ABSTRACT

A system and method optimizes hardware description generated from a graphical program or model having oversampling constraints automatically. The system may include a streaming optimizer, a resource sharing optimizer, a delay balancing engine, and a global scheduler. The streaming optimizer may transform vector data paths to scalar or smaller-sized vector data paths. The resource sharing optimizer may replace multiple, functionally equivalent blocks with a single shared block. The delay balancing may insert one or more elements to correct for data path misalignment. The global scheduler may place portions of the program or model into conditional execution sections and create control logic that controls the model sample times or steps that the portions are enabled. A validation model, a report, or hardware description code that utilizes fewer hardware resources may be generated from a modified version of the model that is created.

19 Claims, 21 Drawing Sheets

(56) References Cited

U.S. PATENT DOCUMENTS

| | | | |
|---|---|---|---|
| 6,584,601 B1 | 6/2003 | Kodosky et al. | |
| 6,651,222 B2 | 11/2003 | Gupta et al. | |
| 7,143,368 B1 | 11/2006 | Plofsky et al. | |
| 7,178,112 B1* | 2/2007 | Ciolfi | G06F 17/504 703/2 |
| 7,376,544 B1 | 5/2008 | Dick et al. | |
| 7,584,465 B1* | 9/2009 | Koh | G06F 9/44557 717/109 |
| 7,698,668 B2* | 4/2010 | Balasubramanian | G06F 8/427 716/106 |
| 7,720,662 B1* | 5/2010 | Aldrich | G06F 11/3692 345/589 |
| 7,882,462 B2 | 2/2011 | Ogilvie et al. | |
| 7,983,879 B1 | 7/2011 | Vetsch et al. | |
| 8,046,386 B2 | 10/2011 | Taitel | |
| 8,122,238 B2* | 2/2012 | Kassas | G06F 17/5054 713/1 |
| 8,352,505 B1* | 1/2013 | Venkataramani | G06F 17/5045 707/756 |
| 8,533,642 B1* | 9/2013 | Ogilvie | G06F 17/5045 716/100 |
| 8,694,947 B1* | 4/2014 | Venkataramani | G06F 17/5045 716/113 |
| 8,745,557 B1* | 6/2014 | Venkataramani | G06F 17/5045 716/102 |
| 8,914,262 B2* | 12/2014 | Zhang | G06F 8/10 703/13 |
| 8,935,137 B1* | 1/2015 | Han | G06G 7/48 703/6 |
| 2002/0080174 A1 | 6/2002 | Kodosky et al. | |
| 2002/0193078 A1 | 12/2002 | MacFarlane et al. | |
| 2003/0016234 A1 | 1/2003 | Mani et al. | |
| 2003/0215017 A1 | 11/2003 | Fang | |
| 2004/0049596 A1 | 3/2004 | Schuehler et al. | |
| 2004/0243964 A1 | 12/2004 | McElvain et al. | |
| 2006/0225021 A1 | 10/2006 | Padalia et al. | |
| 2007/0058572 A1 | 3/2007 | Clauberg | |
| 2007/0113209 A1 | 5/2007 | Park et al. | |
| 2007/0277161 A1 | 11/2007 | Herbordt et al. | |
| 2008/0098349 A1 | 4/2008 | Lin et al. | |
| 2008/0189089 A1 | 8/2008 | Lee | |
| 2008/0234995 A1 | 9/2008 | Newcomb et al. | |
| 2009/0013301 A1* | 1/2009 | Ogilvie | G06F 17/5045 716/104 |
| 2009/0128189 A1 | 5/2009 | Madurawe et al. | |
| 2009/0193239 A1* | 7/2009 | Hanai | G06F 9/30058 712/234 |
| 2013/0116987 A1* | 5/2013 | Zhang | G06F 8/10 703/2 |

OTHER PUBLICATIONS

Improving Modeling Usability: Automated Layout Generation for Simulink—Lars Kristian Klauske—Daimler Center for Automotive Information Technology Innovations, Berlin Institute of Technology; Christian Dziobek-Mercedes-Benz Cars Development, Daimler AG—Jun. 16, 2010.*

Introduction to Simulink® with Engineering Applications Second Edition—Steven T. Karris—Orchard Publications—2006.*

Acosta, Alfonso, "ForSyDe: Rising the Abstraction Level in System Design," Royal Institute of Technology, Stockholm, Sweden, Mar. 27, 2008, pp. 1-98.

"Actel Digital Signal Processing (DSP) Solution," Actel Corporation, <http://web.archive.org/web/20071028055746/www.actel.com/products/solutions/dsp/default.aspx>, Oct. 11, 2007, pp. 1-5.

Akella, Sreesa, "Guidelines for Design Synthesis Using Synopsys Design Compiler," Department of Computer Science Engineering University of South Carolina, Columbia, South Carolina, Dec. 2000, pp. 1-13.

Banerjee, Prithviraj et al., "Overview of a Compiler for Synthesizing MATLAB Programs onto FPGAs," IEEE Transactions on Very Large Scale Integration (VLSI) Systems, vol. 12(3):312-324 (2004).

Bjureus, Per et al., "FPGA Resource and Timing Estimation from Matlab Execution Traces," International Conference on Hardware Software Codesign, Proceedings of the tenth international symposium on Hardware/software codesiqn, pp. 31-36 (2002).

Goering, Richard, "MathWorks Moving Deeper into IC Design," Sep. 18, 2006, pp. 1-3.

Haldar, Malay et al., "FPGA Hardware Synthesis from MATLAB," Fourteenth International Conference on VLSI Design, pp. 299-304 (Jan. 2001).

International Search Report for Application No. PCT/US2007/019734, dated Nov. 11, 2008.

"Lecture Notes," Imperial College, Department of Electrical and Electronic Engineering, Jan. 31, 2006, pp. 1-5.

Martins, Sergio et al., "A high-level tool for the design of custom image processing systems," Proceedings of the 2005 8th Euromicro conference on Digital System Design (OSO'05), pp. 346-349 (Sep. 2005).

"MathWorks™ Products for Signal Processing and Communications," The MathWorks, Inc., Mar. 2008, pp. 1-4.

Nayak, Anshuman et al., "Accurate Area and Delay Estimators for FPGAs," Proceedings of the 2002 Design, Automation and Test in Europe Conference and Exhibition (DATE'02), pp. 862-869 (2002).

Ou, Jingzhao et al., "PyGen: A MATLAB/Simulink Based Tool for Synthesizing Parameterized and Energy Efficient Designs Using FPGAs," Proceedings of the 12th Annual IEEE Symposium on Field-Programmable Custom Computing Machines, pp. 47-56 (Apr. 2004).

"Precision RTL Synthesis Users Manual," 2003c Update 1, Mentor Graphics Corporation, Mar. 2004, pp. 1-119.

Popinchalk, Seth, "Building Accurate, Realistic Simulink Models," Newsletters, The MathWorks, Inc., 2006, pp. 1-10.

Popinchalk, Seth, "Improving Simulation Performance in Simulink," The MathWorks, Inc., <http://www.eetimes.com/General/PrintView/4087424>, Apr. 2012, pp. 1-10.

Portero, Antoni et al., "Study of High Level design methodologies for a MPEG frames I Compressor for a HW/SW Implementation," 2004 IEEE International Conference on Industrial Technology (ICIT), DOS. 1688-1693 (Dec. 2004).

Raudvere, Tarvo, et al., "Application and Verification of Local Nonsemantic-Preserving Transformations in System Design," IEEE Transactions on Computer-Aided Design of Integrated Circuits and Systems, vol. 27, No. 6, Jun. 2008, pp. 1-13.

Sander, Ingo, "System Modeling and Design Refinement in ForSyDe," Royal Institute of Technology, Stockholm, Sweden, Apr. 2003, pp. 1-244.

Simulink® HDL Coder™ 1: User's Guide, The MathWorks, Inc., Mar. 2008, pp. 1-552.

Simulink® 7: User's Guide, The MathWorks, Inc., Sep. 2009, pp. 1-1528.

U.S. Appl. No. 12/963,433, filed Dec. 8, 2010 by Girish Venkataramani, et al. for a Hardware Definition Language Generation for Data Serialization From Executable Graphical Models, all pages.

"Working With Xilinx® Devices and Place and Route Tools," Altium, AP0112 (v1.0), Jan. 13, 2004, pp. 1-6.

Zacher, Darren, "How to Use Register Retiming to Optimize Your FPGA Designs," Mentor Graphics, <http://www.eetimes.com/design/programmable-logic/4014801/How-to-use-register-retiming-to-optimize-your-FPGA-designs>, EE Times Group a UBM company, Dec. 14, 2005, pp. 1-5.

* cited by examiner

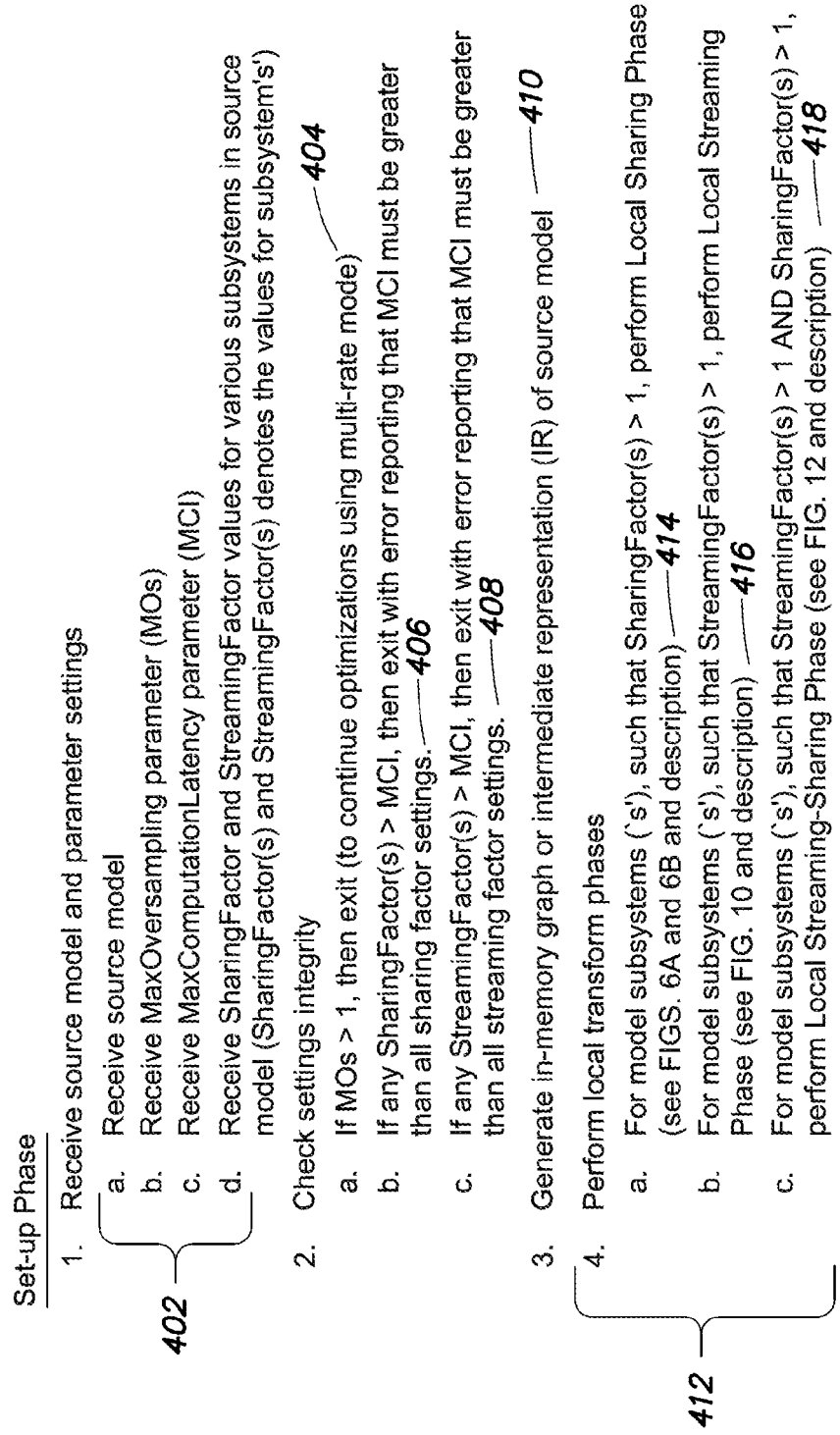

Set-up Phase

1. Receive source model and parameter settings
   a. Receive source model
   b. Receive MaxOversampling parameter (MOs)
   c. Receive MaxComputationLatency parameter (MCI)
   d. Receive SharingFactor and StreamingFactor values for various subsystems in source model (SharingFactor(s) and StreamingFactor(s) denotes the values for subsystem's') ——404

402

2. Check settings integrity
   a. If MOs > 1, then exit (to continue optimizations using multi-rate mode)
   b. If any SharingFactor(s) > MCI, then exit with error reporting that MCI must be greater than all sharing factor settings. ——406
   c. If any StreamingFactor(s) > MCI, then exit with error reporting that MCI must be greater than all streaming factor settings. ——408

3. Generate in-memory graph or intermediate representation (IR) of source model ——410

4. Perform local transform phases
   a. For model subsystems ('s'), such that SharingFactor(s) > 1, perform Local Sharing Phase (see FIGS. 6A and 6B and description) ——414
   b. For model subsystems ('s'), such that StreamingFactor(s) > 1, perform Local Streaming Phase (see FIG. 10 and description) ——416
   c. For model subsystems ('s'), such that StreamingFactor(s) > 1 AND SharingFactor(s) > 1, perform Local Streaming-Sharing Phase (see FIG. 12 and description) ——418

Local Sharing Phase

For a subsystem, s, with SharingFactor <= MCI, do local scheduling as follows:

1. Partition 's' further in to smaller regions such that each region has exactly N=SharingFactor —— 602
   number of resources in it. (For example, if multipliers are being shared, ensure that each region
   has exactly N multipliers).

2. For each subsystem, s', do the following: —— 604 a. Create a sorted list of nodes in s', sorted by reverse topological order. If s' contains
      loops, break the loop by severing the input edge of each delay block in the loop. Let,
      Sort(s'), be the sorted order of nodes in s'.

b. Perform As Soon As Possible (ASAP) scheduling.

i. Let T=0, Cycle(n) = undef, for all nodes in Sort(s'). Resource (t)=0, for all 0 <= t <
         SharingFactor. Let Cycle(in) = 0, for all input ports, 'in', in s'.

ii. For each node, n, in Sort(s'), check the following:

1. If all inputs to n are scheduled, Cycle(n) <= T, AND if n is a shared
             resource AND Resource(T) = 0, then 'n' is ready to be scheduled 2. If 'n' is scheduled, then a. If n is a shared resource, update Resouce(T) = Resource(T) + 1,
             b. Cycle(n) = T
             c. Remove 'n' from Sort(s')

iii. If Sort(s') is empty then we are done, exit.

iv. If no more nodes in Sort(s') can be scheduled, then let T = T + 1. Go back to step
          2(b)(ii).

⎫
⎬ 606
⎭

*FIG. 6A* c. On every edge, e, from source node, src(e) to receiving node, dst(e), insert a delay line of K = Cycle(dst) - Cycle(src). ——608 d. Insert a (local) counter in to s' that counts from 0 to (SharingFactor - 1). Let output of counter be signified by LocalCount. If subsystem's schedule falls on the boundary as defined by 7(c)(iii)(3) in the global phase above (see FIG. 4B), then set the counter to start counting at value, k = ModEnd(n) + 1. ——610 e. Restructure s' to use only one resource.

i. Use a data-unbuffer block. If subsystem's schedule falls on the boundary as defined by 3(c)(iii)(3) in the global phase above, then set the data-unbuffer's internal counter to start counting at value, k = ModEnd(n) + 1. ——614 ii. Use a hardware demux block that takes a scalar input and LocalCount and creates a vector of length SharingFactor, such tht input is routed to the i-th element of output vector, where i=LocalCount. All other output values may retain previous state. ——616

⎱ 612 f. For every unit-delay block, n, that is inside a feedback loop, replace the block with a unit-delay enabled block and connect the enable input to logic that computes. LocalCount == Cycle(n). ——618

3. Set Latency(s') = SharingFactor - 1. ——620

FIG. 6B

Local Streaming Phase

For a subsystem, s, with StreamingFactor ≦ = MCI, perform transformation:

1. Insert a data-unbuffer block on each imput port. —— 1002
2. Insert a hardware demux block on each output port. The control signal for the hardware demux may be generated by a local counter counting from 0 to (StreamingFactor - 1). —— 1004
3. Expand all state-holding blocks, e.g., delay blocks, by the streaming factor. Specifically, a $Z^{(-k)}$ delay becomes a $Z^{(-k*N)}$ delay, where N = StreamingFactor. —— 1006
4. Insert matching delays on each output port to account for the scheduling of each element of the vector channel. The 1st element of the channel may be scheduled in time step 1, the 2nd element may be scheduled in time step 2, and so. It should be understood that the order may be arbitrary and can be changed. The net effect of delay balancing may insert (N-1) delays on the channel scheduled in the first step, and so on. In general, for a channel scheduled in step 'j', the output port on that channel may have (N - j - 1) delays. —— 1008
5. Set Latency(s) = StreamingFactor - 1. —— 1010

FIG. 10

Local Sharing+Streaming Phase

If both sharing and streaming are requested on the same substystem, then:

1. Do the local sharing transform as described in connection with FIGS. 6A and 6B and description. —1202
2. Do the local streaming transform as described in conneciton with FIG. 10 and description, with the —1204 following changes:

a. Create a new counter counting from 0 to (StreamingFactor * SharingFactor) -1. Label the output of the count-value as ShareStreamCount. —1206 b. Insert the local counter from the streaming transform in to an enabled subsystem, and let the enable input be connected to the following logic: mod(ShareStreamCount, —1208 StreamingFactor) == 0.

c. If there is a delay $Z^k$, it may be transformed differently depending on whether it is contained in the shared subsystem or not, as indicated at step 1210. If the delay is contained inside the shared subsystem, then it may be transformed to a delay whose delay length is $Z(k*(Sh*St))$, where Sh = Sharing Fact and St = Streaming Factor. If the delay is not contained inside the shared subsystem, then the delay may be expanded to $Z(k*St)$. —1210

FIG. 12

Global Phase

1. Perform delay balancing by propagating delay values through the model graph —— 1402
   a. Set scheduled time step, SchedStart(n) = SchedEnd(n) = 0, for all input ports, 'n' of the model graph —— 1404
   b. Walk the graph in reverse topologically sorted order. For each node: —— 1406
      i. At each node, n, compare SchedEnd(i) values for each input 'i'. Set SchedStart(n) = MAX(SchedEnd(i)), for all inputs. —— 1408
      ii. On each input, k, insert SchedStart(n) - SchedEnd(k) delays. —— 1410
      iii. Set SchedEnd(n) = SchedStart(n) + Latency(n) —— 1412
2. Perform additional optimizations, e.g., distributed pipelining, retiming, etc., if any. —— 1414
3. Perform global scheduling Phase —— 1416
   a. Insert a global counter set to count from 0 to (MCI-1). Let 'GlobalCtr' refer to the output value of this counter —— 1418
   b. Identify the node-set, 'ScheduleUnits' that includes all of the below:
      i. Subsystem, s, if 's' has undergone sharing or streaming or both in the local phase —— 1420
      ii. Any node, n, such that SchedStart(n) != SchedEnd(n) —— 1422
      iii. The coarsest grained subsystems, s', such that s' contains no nodes or subsystems listed in (i) and (ii) above. —— 1424
      iv. Any node, n, that is not part of (i)-(iii) and has persistent state logic, e.g., delay blocks, Stateflow chart, etc. Any node whose current output value depends on the output value generated in a previous time step. —— 1426

FIG. 14A c. For each node, n, that is a member of ScheduleUnits:

i. Encapsulate 'n' in to an enabled subsystem (conditional execution subsystem) —— 1428 ii. Insert a bypass register on all inputs to 'n' —— 1430 iii. Compute enable logic for 'n' as follows:

1. Let ModStart(n) = mod(SchedStart(n), MCI), ModEnd(n) = mod(SchedEnd(n), MCI) —— 1434
  2. If ModStart(n) < ModEnd(n), then EnableLogic(n) = (GlobalCtr >= ModStart(n)) && (GlobalCtr < ModEnd(n)), otherwise —— 1436
  3. EnableLogic(n) = (GlobalCtr >= ModStart(n)) || (GlobalCtr < ModEnd(n)) —— 1438
  4. Connect the output of enable logic to the enable (or condition) input of the enabled subsystem —— 1440

}—— 1432

For a node 'n', if ModStart(n) > ModEnd(n), the initial value of certain blocks within node 'n', such as counters and Data unbuffer blocks, may be set to MCL - ModStart(n) —— 1442

4. Generate new "optimized" graphical model to reflect the above structure/architecture. —— 1444

*FIG. 14B*

5. Create a validation model to show equivalence checking:

a. Create a new model with original source model and the new optimized model. —1448
   b. Send the same inputs to both sub-models. —1450
   c. Create a counter that counts from 0 to MCI - 1. —1452
   d. Insert original model in an enabled subsystem. The enable input is connected to logic that checks that counter output in(c) above is equal to 0. —1454
   e. Collect the outputs from both sub-models. —1456
   f. On the optimized model outputs, insert a compensating delay line of length = MCI - mod(SchedEnd(output), MCI), where 'output' refers to the output port of the optimized model. Following this, insert a downsample by N = MCI block on each output of optimized sub-model (we are comparing the output values every MCI cycles). —1458
   g. Insert a downsample by N = MCI block on each output of original sub-model. Following this, insert a matching delay-line of length = cell(SchedEnd(output) / MCI), on each output of the original model following the downsample block (we are comparing the output values every MCI cycles). —1460
   h. Compare the values of the outputs from (f) and (g) above. If they are different in any cycle, then it implies a value mismatch and error in the algorithm. —1462

—1446

6. Continue to HDL or C code-generation from this given structure. —1464

*FIG. 14C*

SYSTEMS AND METHODS FOR HARDWARE RESOURCE SHARING

CROSS-REFERENCE TO RELATED APPLICATIONS

The present application claims priority to U.S. Provisional Patent Application Ser. No. 61/790,848, filed Mar. 15, 2013 for Systems and Methods for Hardware Resource Sharing and to U.S. Provisional Patent Application Ser. No. 61/733,553, filed Dec. 5, 2012 for Hardware Resource Sharing in a Timed Execution Model with Overclocking Constraints, and relates to commonly assigned U.S. patent application Ser. No. 12/963,371, filed Dec. 8, 2010, and patented as U.S. Pat. No. 8,694,947 for Resource Sharing Workflows within Executable Graphical Models, which applications are hereby incorporated by reference in their entireties.

BRIEF DESCRIPTION OF THE DRAWINGS

The disclosure below refers to the accompanying drawings, of which:

FIG. 4 is a pseudo code diagram of a method in accordance with embodiments of the present disclosure;

FIGS. 6A and 6B are partial views of a pseudo code diagram of a method in accordance with embodiments of the present disclosure;

FIG. 10 is a pseudo code diagram of a method in accordance with embodiments of the present disclosure;

FIG. 12 is a pseudo code diagram of a method in accordance with embodiments of the present disclosure;

FIGS. 14A-14C are partial views of a pseudo code diagram of a method in accordance with embodiments of the present disclosure;

DETAILED DESCRIPTION OF ILLUSTRATIVE EMBODIMENTS

Briefly, the present disclosure relates to systems and methods for optimizing code, such as hardware description code, generated from a source graphical program or model automatically where the source model has overclocking constraints. The source model may represent a device under test (DUT), and may execute over a plurality of time steps, model steps, or event times, which may have fixed or variable sizes. The hardware description code may be used to configure target hardware to implement the algorithm, e.g., the procedures and/or operations, specified by the source model.

In some embodiments, a code generation system of a modeling environment may include a plurality of components. In particular, the code generation system may include an integrity checker, an intermediate representation (IR) generator, an optimization engine, a report generator, and a graphical model generator. The optimization engine may include a streaming optimizer, a resource sharing optimizer, a delay balancing engine, and a global scheduler. Front and back-end processing units may be associated with the IR generator.

The code generation system may receive the source model and a plurality of parameters. The parameters may include a maximum oversampling value, a maximum computation latency (MCL) value, and a sharing factor and/or a streaming factor for the source model or one or more model portions, such as one or more subsystems. The maximum oversampling value may indicate whether oversampling is available for the source model, and if so the amount of oversampling that is available. The MCL value may indicate the data rate of the inputs to the source model. That is, the MCL may specify the number of time steps for which the model's inputs are expected to be stable, e.g., unchanged. The sharing factor may indicate a degree to which functionally equivalent elements of the subsystem may be shared. More specifically, the sharing factor may indicate the number of blocks that can share a single resource. For example, if the sharing factor for a subsystem is four, the system may identify and replace four instances of a resource with a single instance that is shared.

For a subsystem that performs vector computations, the code generation system may, by default, generate HDL code that is a fully parallel implementation of the vector computations. For example, if the subsystem performs an Add operation on a vector having eight elements, the generated code may include eight data paths each having its own Adder. The streaming factor indicates a degree to which resources, such as the Adders, are to be shared. The system may utilize the specified streaming factor to transform a vector data path of the subsystem to a scalar data path or to several smaller-sized vector data paths. This permits some number of computations to share a hardware resource.

Figure 1:
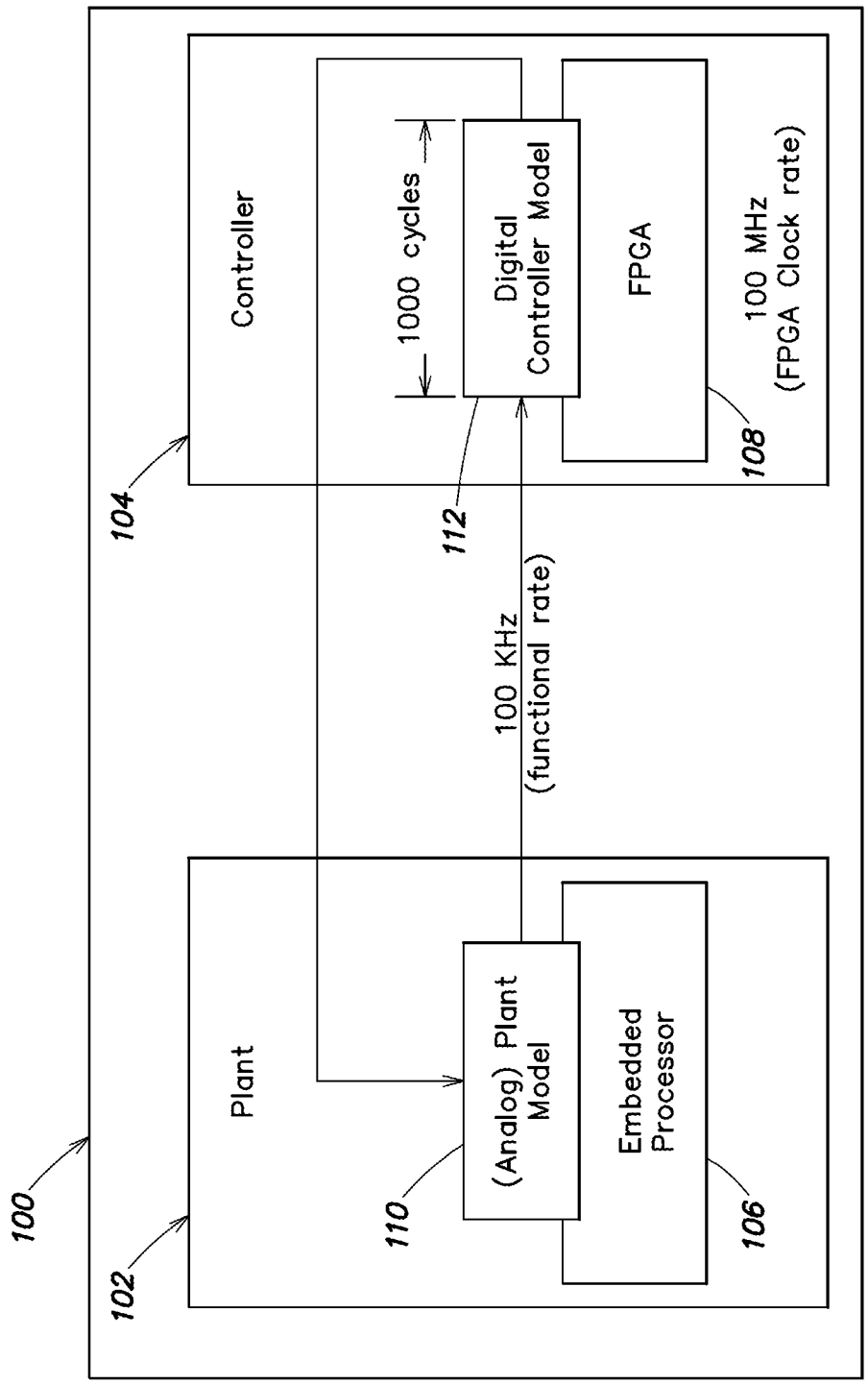
FIG. 1 is a schematic illustration of a plant and a controller.

FIG. 1 is a highly schematic illustration of a system 100 that includes a plant 102 and a controller 104. The plant 102 may include one or more embedded processors, such as embedded processor 106, that provide inputs to the controller 104, and receive outputs from the controller 104. The controller 104 may include one or more programmable logic devices, such as a Field Programmable Gate Array (FPGA) 108. The embedded processor 106 of the plant 102 may operate at a first rate, such as 100 KHz, while the FPGA 108 of the controller 104 may operate at a second rate, such as 100 MHz. Thus, the MCL value may be 1000. A developer may create a first source model, such as plant model 110, that models the plant 102, and a second source model, such as digital controller model 112, that models the controller 104. The developer may utilize the plant model 110 to create, evaluate and revise the digital controller model 112. When the digital controller model 112 is completed by the developer, a hardware description may be generated from the digital controller model 112, and the hardware description used to configure the FPGA 108 to implement the controller 104 in a real-world system 100.

A subsystem (not shown) of the digital controller model 112 may include several instances of the same or functionally equivalent element, such as multiple instances of Gain or Product blocks. By default, the code generation system may generate HDL code for the digital controller model 112 that includes at least one resource for each of these equivalent blocks. As noted, the sharing factor indicates a degree to which such Gain or Product blocks may be shared. If the digital controller model 112 includes an Adder element operating on an eight element wide vector path, and a streaming factor of four is specified, then the eight element wide vector path will be converted to two four element wide vector paths, reducing the number of Adders from eight to two. The higher the streaming factor, the higher the degree of sharing.

The integrity checker of the code generation system may determine whether the specified sharing and/or streaming factors are less than the MCL. If so, the code generation system may proceed to generate optimized code for the source model where the optimized code shares resources of the one or more subsystems. If one or more of the sharing and/or streaming factors equal or exceed the MCL, the integrity checker may issue one or more warning or error messages and may suspend the code generation process.

The IR generator may generate an IR of the source model, and the optimization engine may alter the IR to produce a modified IR. In particular, the streaming and resource sharing optimizers may transform those portions of the IR corresponding to the subsystems to produce modified subsystems that share resources according to the specified sharing and/or streaming factors. In some embodiments, the streaming and sharing optimizers may achieve resource sharing within the subsystems without overclocking any portions of the subsystems. The streaming and sharing optimizers may insert new objects or blocks, such as data unbuffer blocks and Hardware (HW) demultiplexor (demux) blocks to the subsystems being optimized.

The delay balancing engine may determine whether the modifications made by streaming and/or resource sharing optimizers introduce any delays or latencies in the subsystems. If so, the delay balancing engine may modify existing blocks of the subsystems, such as Delay blocks, or may insert additional blocks, such as other Delay blocks, into one or more data paths of the subsystems in order to ensure that any delays or latencies are accounted for. More specifically, the delay balancing engine may ensure that parallel data paths of the subsystems remain aligned with each other with respect to timing as specified in the source model.

The global scheduler may perform global scheduling of the source model. In particular, the global scheduler may insert a global counter and configure it to count from 0 to MCL-1. The global scheduler also may encapsulate the modified systems into conditional execution subsystems, such as enabled subsystems. The global scheduler also may insert logic between the global counter and the enabled subsystems that enables the respective subsystems during predetermined time steps. Other elements or components of the source model also may be encapsulated into enabled subsystems, which may be configured to be enabled during predetermined time steps.

The validation model generator may create an executable, graphical validation model from the IR as modified by the optimization engine. The validation model, which may be presented to a user, e.g., on a display of a workstation, may provide a visual indication of the modifications that were made to the source model. Furthermore, the source and validation models may be part of a validation environment that may be operated by the user to confirm that the validation model, which represents the optimized version of the source model, and the source model both produce the identical results.

The optimizations performed by the optimization engine may be user-configurable. Specifically, the degree or level of optimization performed by the streaming and resource sharing optimizers may be a function of one or more settable parameters. The user may adjust these settable parameters and repeat the process to evaluate or explore various optimization alternatives. The report generator may evaluate IRs as modified by the optimization engine, and produce summaries of the hardware resources that would be required to implement the modified IRs in hardware. The user may examine these reports, and select a particular optimization that achieves one or more goals or objectives of the user. The evaluation of different optimizations may be made without generating HDL code. In some embodiments, the user may wait until an appropriate optimization of the source model is achieved before generating HDL code from the optimized version of the source model.

When the user has settled on a particular optimization of the source model, the user may direct the code generation system to generate HDL code from the modified IR that was selected. The code generation system may generate HDL code, e.g., VHDL, Verilog, SystemC code, or System Verilog code, from the modified IR, and the generated HDL code may remain bit true and cycle accurate to the source model. It should be understood that the cycle accuracy of the generated HDL code relative to the execution of the source model may be modulo a pre-determined initial latency. The generated HDL code may include elements representing the data unbuffer, HW demux, delay blocks, conditional execution subsystems, such as enabled subsystems, and counters and logic blocks for controlling the conditional execution subsystems, that were added by the streaming and resource sharing optimizers and the delay balancing engine. Nonetheless, the generated hardware description code may result in fewer physical resources being consumed on the target hardware than might otherwise be needed to implement the source model in hardware.

Figure 2:
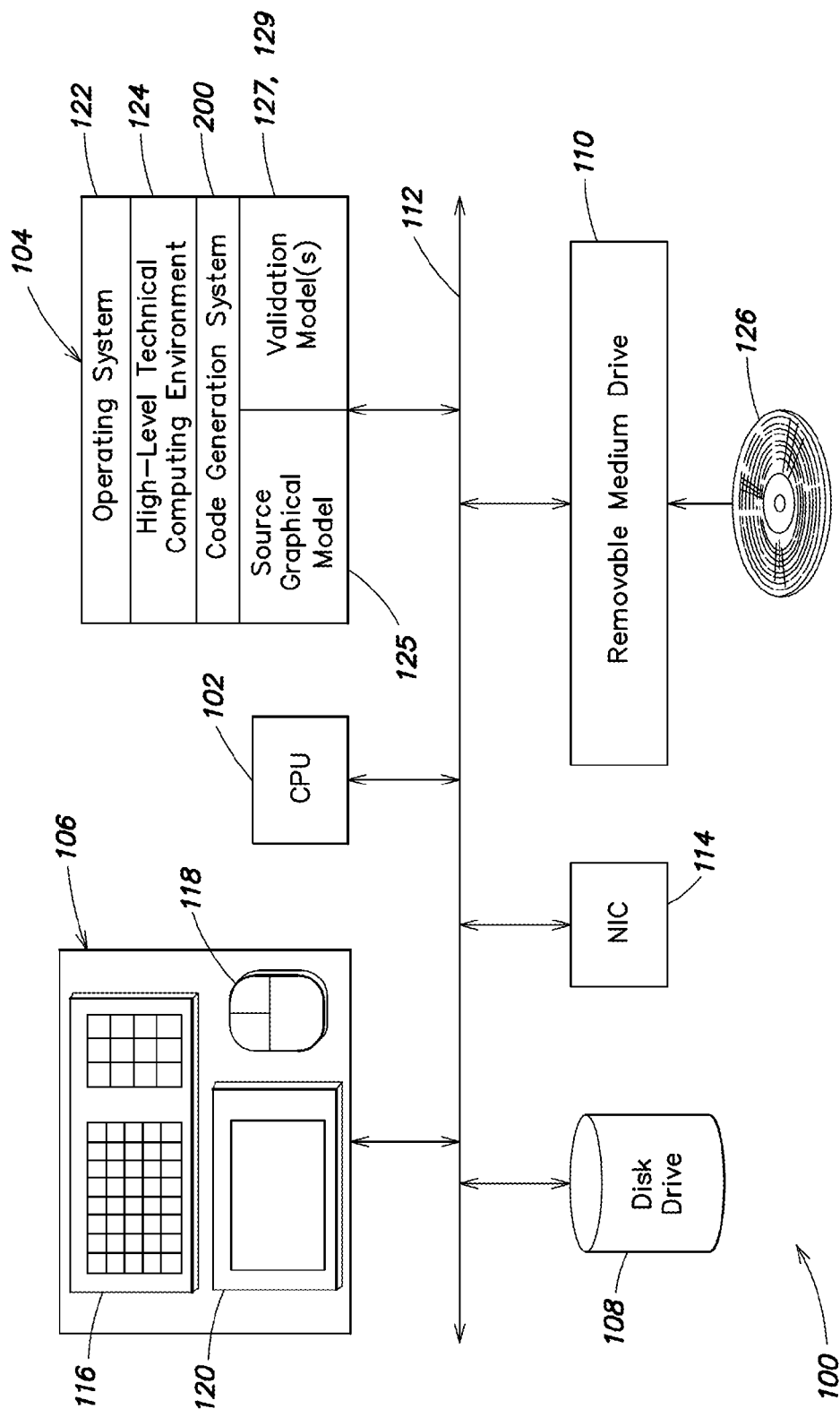
FIG. 2 is a schematic illustration of a computer or data processing system.

FIG. 2 is a schematic illustration of a computer or data processing system 100 for implementing and utilizing some embodiments of the disclosure. The computer system 100 includes one or more processing elements, such as a central processing unit (CPU) 102, a main memory 104, user input/output (I/O) 106, a disk drive 108, and a removable medium drive 110 that are interconnected by a system bus 112. The computer system 100 may also include a network interface card (NIC) 114. The user I/O 106 may include a keyboard 116, a mouse 118 and a display 120.

The main memory 104 may store a plurality of libraries or modules, such as an operating system 122, and one or more applications running on top of the operating system 122, including a technical computing environment 124. The main memory 104 may also include a code generation system 200. The code generation system 200 may be configured as a toolbox or an add-on product to the high-level technical computing environment 124. Furthermore, as described herein, the main memory 104 may include a program specification, such as a source graphical model 125, and one or more validation models, such as validation models 127, 129.

The removable medium drive 110 is configured to accept and read a computer readable medium 126, such as a CD, DVD, floppy disk, solid state drive, tape, flash memory or other medium. The removable medium drive 110 may further be configured to write to the computer readable medium 126.

Suitable computer systems include personal computers (PCs), workstations, laptops, tablets, palm computers and other portable computing devices, etc. Nonetheless, those skilled in the art will understand that the computer system 100 of FIG. 1 is intended for illustrative purposes only and that the present disclosure may be used with other computer systems, data processing systems or computational devices. The present disclosure may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

As indicated above, a user or developer, such as an engineer, scientist, programmer, etc., may utilize the keyboard 116, the mouse 118 and the computer display 120 of the user I/O 106 to operate the high-level technical computing environment 124, and create the source graphical model 125.

Suitable high-level technical computing environments for use with embodiments of the present disclosure include the MATLAB® and SIMULINK® technical computing environments from The MathWorks, Inc. of Natick, Mass., the LabVIEW programming system from National Instruments Corp. of Austin, Tex., and the Visual Engineering Environment (VEE) from Agilent Technologies, Inc. of Santa Clara, Calif., a Unified Modeling Language (UML) system, a Systems Modeling Language (SysML) system, System Generator from Xilinx, Inc., C, C++, System-C, Handel-C, and Catapult-C, among others. Those skilled in the art will recognize that the computer system 100 need not include any software development environment at all. The present disclosure may be used with other time-driven modeling environments, such as the Ptolemy Project from University of California at Berkeley.

A model may simulate, e.g., approximate operation of, a system. Exemplary systems include physical systems, such as weather systems, financial markets, plants, controllers, etc. A model may be executed in order to simulate the system being modeled, and the execution of a model may also be referred to as simulating the model.

The high-level technical computing environment 124 may include a simulation engine (not shown) configured to simulate, e.g., execute, block diagrams or models, such as the source graphical model 125, on the computer 100. That is, icons or blocks of the model may represent computations, functions or operations, and interconnecting lines or arrows among those blocks may represent data, signals or relationships among those computations, functions or operations. The icons or blocks, moreover, may be selected by the user from one or more libraries or palettes that contain icons or blocks for the blocks supported by the high-level technical computing environment 124. The high-level technical computing environment 124 may include or support a graphical user interface (GUI) having a Run button that may be selected by the user. The high-level technical computing environment 124 may also be configured to receive a run command entered by the user, e.g., in the GUI or in a Command Line Interface (CLI). In response to the user selecting the Run button or entering the run command, the simulation engine of the high-level technical computing environment 124 may execute the model, and may present the results of the model's execution to the user via the display 120.

The high-level technical computing environment 124 may further include one or more debugging facilities that may, for example, allow halting a simulation at one or more breakpoints. A breakpoint may be specified for a variable, for example, to halt execution when the variable value changes. A breakpoint also may be conditional, for example, only halting execution when a variable value changes if the current time of execution is in a certain time interval, or only halting execution when a variable has changed a specified number of times.

A suitable simulation engine includes the simulation engine included in the Simulink modeling environment, the execution engine of the LabVIEW programming system, and the execution engine of the Agilent VEE programming system, among others.

The high-level technical computing environment 124, moreover, may include or support a graphical user interface (GUI) having a Code Generation button that may be selected by the user. The high-level technical computing environment 124 may also be configured to receive a code generation command entered by the user, e.g., in the GUI or in a Command Line Interface (CLI). In response to the user selecting the Code Generation button or entering the code generation command, the code generation engine of the high-level technical computing environment 124 may generate code for at least part of the model, and may present the results of the code generation to the user via the display 120.

Those skilled in the art will understand that the MATLAB® technical computing environment is a math-oriented, textual programming environment for digital signal processing (DSP) design, among other uses. The SIMULINK® technical computing environment is a graphical, block-based environment for modeling and simulating dynamic systems, among other uses.

Figure 3:
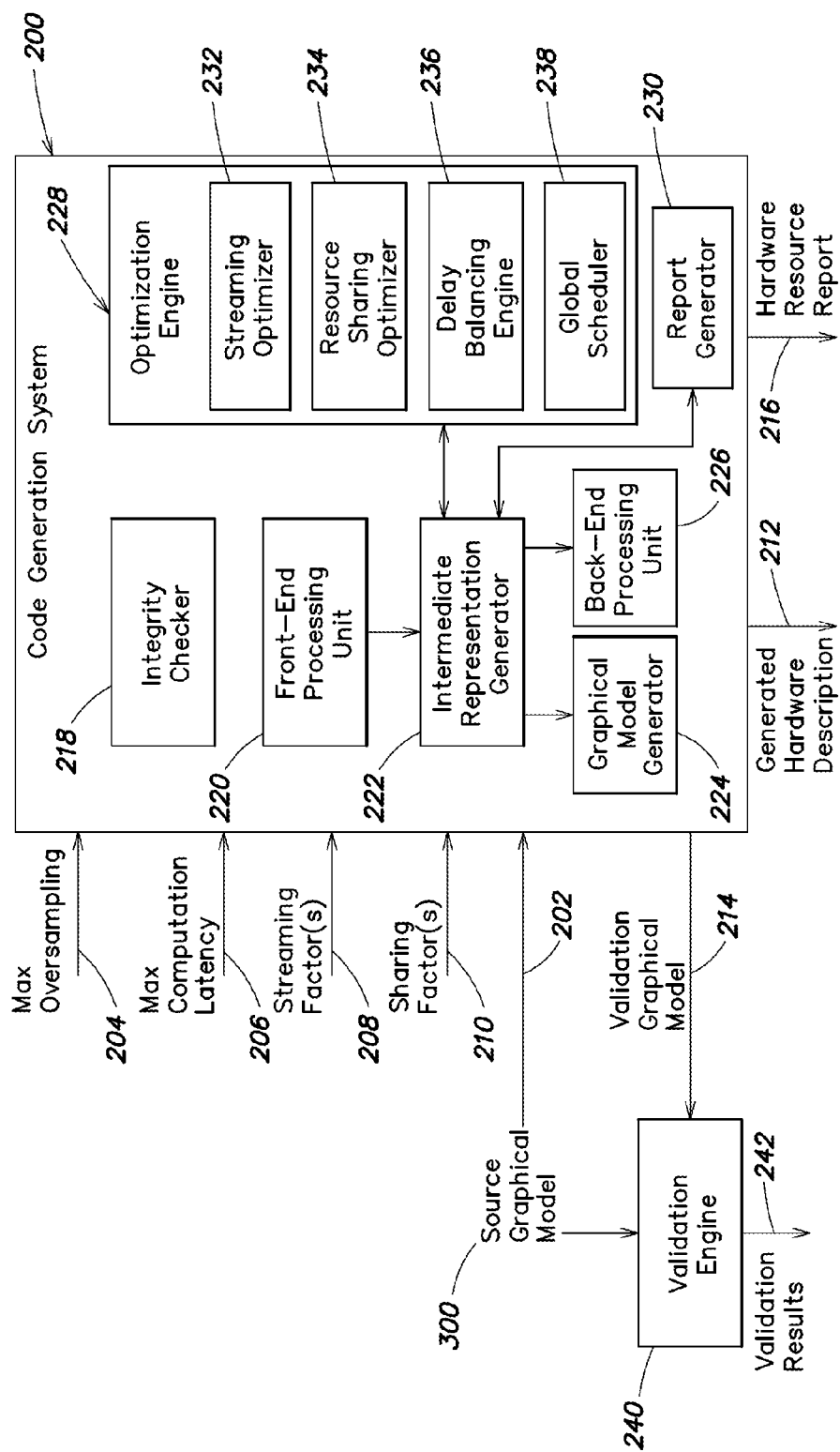
FIG. 3 is a highly schematic, functional block diagram of some embodiments of a code generation system in accordance with embodiments of the present disclosure.

FIG. 3 is a highly schematic, functional block diagram of some embodiments of the code generation system 200. The code generation system 200 may receive a source graphical model 300 (e.g., the source graphical model 125 created by the user or developer using the high-level technical computing environment 124), as indicated by arrow 202. The source graphical model 300 may be a Simulink model, a Stateflow chart, a LabVIEW block diagram, a VEE diagram, etc. The code generation system 200 also may receive a maximum (max) oversampling value, as indicated by arrow 204, a maximum (max) computational latency (MCL) value, as indicated by arrow 206, one or more streaming factors, as indicated by arrow 208, and one or more sharing factors, as indicated by arrow 210. As described herein, the code generation system 200 may produce hardware description code corresponding to the source graphical model, as indicated by arrow 212, that is optimized, and yet remains bit true and cycle accurate (modulo a well-defined initial latency) to the simulation of the source graphical model. Exemplary hardware descriptions that may be generated include hardware description language (HDL) code, such as VHDL or Verilog code, SystemC code, System Verilog code, embedded MATLAB code, vendor or target specific HDL code, such as Xilinx FPGA libraries, etc. The code generation system 200 may also produce one or more validation models, as indicated by arrow 214, and one or more hardware resource reports, as indicated by arrow 216.

The code generation system 200 may include a plurality of components or modules. Specifically, the code generation system 200 may include an integrity checker 218, a front-end processing unit 220, an intermediate representation (IR) generator 222, a graphical model generator 224, a back-end processing unit 226, an optimization engine 228, and a report generator 230. The optimization engine 228 may include one or more sub-components or modules, such as a streaming optimizer 232, a resource sharing optimizer 234, a delay balancing engine 236, and a global scheduler 238. The code generation system 200 may include or have access to, e.g., be in communication with, a validation engine 240. As described herein, the validation engine 240, which may be part of the high-level technical computing environment 124, may receive the source and validation models, and produce validation results, as indicated by arrow 242.

The integrity checker 218, front-end processing unit 220, IR generator 222, graphical model generator 224, back-end processing unit 226, optimization engine 228, report generator 230, and validation engine 240 may each comprise registers and combinational logic configured and arranged to produce sequential logic circuits. In the illustrated embodiment, the integrity checker 218, front-end processing unit 220, IR generator 222, graphical model generator 224, back-end processing unit 226, optimization engine 228, report generator 230, and validation engine 240 may be implemented through one or more software modules or libraries containing program instructions pertaining to the methods described herein, that may be stored on main memory 104 and/or computer readable media, such as computer readable medium 126, and executable by one or more processing elements, such as CPU 102. Other computer readable media may also be used to store and execute these program instructions. In alternative embodiments, various combinations of software and hardware, including firmware, may be utilized.

As described, the streaming optimizer 232, resource sharing optimizer 234, delay balancing engine 236, and global scheduler 238 may change the original IR that was created from the source graphical model 125. For example, new nodes, such as nodes representing Data Unbuffer, Hardware Demux, and Delay blocks, may be added. This modified version of the original PIR may be referred to as a code generation PIR, and optimized hardware description code may be generated from the code generation PIR. In addition, a validation model may be generated from this modified PIR.

Set-Up Phase

FIG. 4 is a diagram of a method in accordance with some embodiments of the disclosure.

The code generation system 200 may receive a source model and a plurality of parameters for the model, such as a max oversampling parameter value, a max computation latency parameter value, and one or more sharing and/or streaming factors for portions of the source model, such as subsystems, as indicated at section 402. In particular, portions of the source model 125 may be organized into hierarchical levels, and these portions may be represented as subsystem blocks (also referred to as subsystems). The received streaming and/or sharing factors may be specified for various subsystems of the source model. For example, streaming factors may be specified for a first set of subsystems, sharing factors may be specified for a second set of subsystems, and combinations of streaming and sharing factors may be specified for a third set of subsystems.

The integrity checker 218 may determine whether sharing may be achieved by oversampling portions of the model by determining whether the max oversampling parameter value is greater than one, as indicated at line 404. If it is, the optimization engine 228 may utilize a multi-rate mode to share resources. The integrity checker 218 also may determine whether any of the specified sharing factors exceed the max computation latency and, if so, may issue an error or warning message, as indicted at line 406. In addition, the integrity checker 218 may determine whether any of the specified streaming factors exceed the max computation latency and, if so, may issue an error or warning message, as indicated at line 408.

The code generation system 200 and/or the high-level technical computing environment 124 may include a user interface component that generates a user interface, such as a graphical user interface (GUI), for presentation to the user, e.g., on the display 120 of the computer system 100. The GUI may include one or more controls through which the user can select or specify options, such as a source model (or portion thereof) for which code generation is to be performed, and the parameter values, e.g., max oversampling, max computation latency, sharing factor, and streaming factor.

Figure 5:
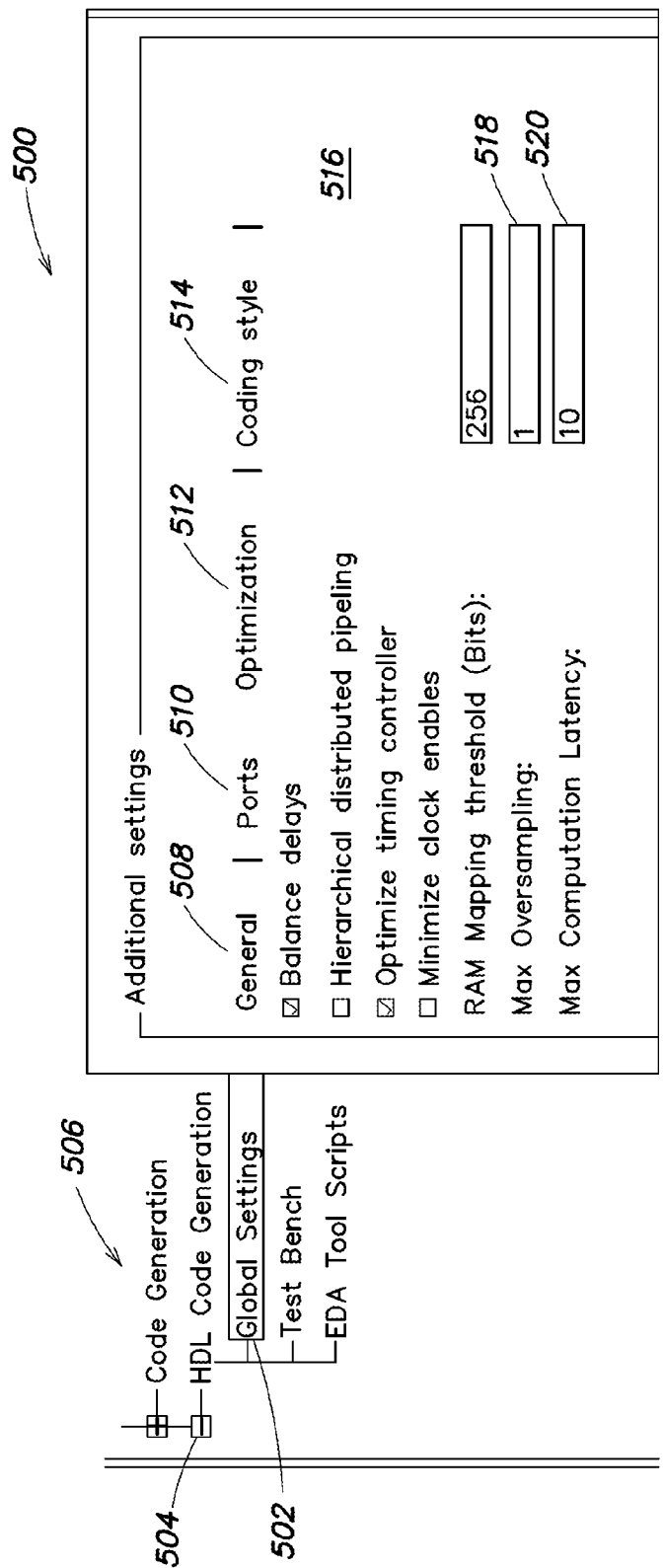
FIG. 5 is an illustration of an exemplary User Interface (UI) in accordance with embodiments of the present disclosure.

FIG. 5 is an illustration of an exemplary settings GUI 500. The settings GUI 500 may be accessed from a 'Global Settings' entry 502 of an 'HDL Code Generation' branch 504 of an options tree 506. The settings GUI 500 may include a plurality of tabs that organize various settings into groups, such as a General tab 508, a Ports tab 510, an Optimization tab 512 and a Coding style tab 514. Selection of the Optimization tab 512 may present an Optimization pane 516, as shown in FIG. 5, and the Optimization pane 516 may include a plurality of interface elements, such as checkboxes, data entry fields, drop down boxes, etc., that may be operated by a user to select desired parameter values. In particular, the Optimization pane 516 may include a 'Max Oversampling' data entry box 518 through which a user may specify the max oversampling parameter value for a source model, and a 'Max Computation Latency' data entry box 520 through which a user may specify the max computation latency value for the source model. The sharing and streaming factors also may be specified explicitly, e.g., through other portions of the settings GUI 500, or they may be implicit given one or more constraints. For example, the user may identify a lower bound on the time step at which blocks execute, and the streaming factor may be inferred from this.

It should be understood that the initiation of the code generation, the designation of the source model (or portion thereof), and the specification of the max oversampling, max computation latency, sharing factor, and streaming factor may alternatively or additionally be specified textually through a Command Line Interface (CLI).

The front-end processing unit 220 may perform a number of preliminary tasks, such as capturing dataflow relationships specified in the source model 125, if any, determining block semantics, such as the type of block, determining particular block and/or subsystem parameter settings, as established by the user, etc. This information may be provided by the front-end processing unit 220 to the Intermediate Representation (IR) generator 222.

The IR generator 222 may generate an in-memory graph or intermediate representation (IR) of the source model 125 or portion thereof, as indicated at line 410. In some embodiments, the in-memory representation is in a form and structure that is suitable for use in generating hardware description code as well as returning the in-memory representation back into an executable graphical model. In some embodiments, the in-memory representation may be in the form of a hierarchical Data Flow Graph (DFG), referred to as Parallel Intermediate Representation (PIR), which has a plurality of nodes interconnected by edges. The nodes of the PIR, also known as components, may represent blocks from the source model or designated subsystem in an abstract manner, and the edges of the PIR, called signals, represent the connections between the blocks of the model or subsystem. Special nodes, called network instance components (NICs), provide hierarchy in the PIR, for example, by abstractly representing subsystems of the model. That is, each block of the source model 125 or subsystem may map to one or more nodes of the PIR, and connection of the source model 125 may map to one or more edges of the PIR.

Signals specified in the source model 125 may be continuously defined over a period of time based on values computed at points in time during the period. For example, a signal value may be defined over an interval of time with a start time and a stop time by extrapolating the value of the signal computed at the start time. The extrapolation may be based on a zero-order hold. As another example, a signal value may be defined over an interval of time with a start time and a stop time by interpolating the value of the signal computed at the start time and the stop time. The interpolation may be based on a first-order hold.

In some embodiments, the in-memory representation may have a plurality of hierarchically arranged levels. More specifically, the PIR may be a top-level of the in-memory representation of the source model 125, and one or more of the components of the PIR may be a particular type or form of in-memory representation. For example, one or more components of the PIR may be a Control Flow Graph (CFG), Control Data Flow Graph (CDFG), program structure tree (PST), abstract syntax tree (AST), etc. A CDFG may capture the control flow as well as the data flow of a graphical model through data dependency and control dependency edges.

The in-memory representation or IR may be stored in memory, such as main memory 104. As described, the optimization engine 228 may parse the PIR, gathering information about the PIR, and may perform a number of modifications to the PIR thereby generating a modified PIR. The optimization engine 228 may operate on the PIR or the source model 125. For ease of description, at least some of the operations are described with reference to the source model 125 rather than the PIR. Similarly, while the optimization engine 228 may be configured to operate on a subsystem of a model, the functions performed by the optimization engine 228 are described as operating on the source graphical model 125.

The source graphical model 125 may represent a subsystem of a larger model (not shown). This larger model, which may alternatively be referred to as a parent model, may include the source graphical model 125 by reference, and may include more than one instance of the source graphical model 125. The source graphical model 125 may be stored in a shared repository such as, for example, a library, or the source graphical model 125 may be stored separately in an individual repository such as, for example an electronic file. The interface between the parent model and the source model 125 may be stored by the parent model. This interface may include, for example, the number of input ports, the number of output ports, the data type of input and output ports, sample time of input and output ports, dimensions of input and output ports, etc. The parent model also may store information of the source model 125, such as the version number of the source model 125.

The optimization engine 228 may perform local transformations on the subsystems that have been marked for optimized hardware description generation, as indicated at section 412. More specifically, for subsystems whose sharing factor is greater than one, the optimization engine 228 may optimize the respective subsystems, as indicated at line 414. For subsystems whose streaming factor is greater than one, the optimization engine 228 may optimize the respective subsystems, as indicated at line 416. For subsystems whose sharing and streaming factors are greater than one, the optimization engine 228 may optimize the respective subsystems, as indicated at line 418. Further details of these procedures are described herein.

Local Resource Sharing Phase

FIGS. 6A-6B are partial views of a pseudo code illustration of a method of performing local resource sharing in accordance with some embodiments of the disclosure.

The resource sharing optimizer 234 may search the in-memory representation, e.g., the PIR, to find functional components, such as blocks and/or subsystems, of the subsystem that are functionally equivalent with each other. The resource sharing optimizer 234 may operate on the subsystem or on an in-memory representation of the subsystem. For convenience, reference is made herein to the subsystem. Two blocks of the subsystem may be considered functionally equivalent by the resource sharing optimizer 234 if the following conditions are met:

(1) the two blocks being compared are both the same type (or kind) of component, e.g., they are both Product blocks, or Gain blocks, etc., (2) the values of the block parameters (if any) for the two blocks being compared are the same, and (3) the inputs and outputs of the two blocks being compared are identical in number, data type, complexity, and signal rate.

Two subsystems of a subsystem may be considered to be equivalent, if the following conditions are met:

(1) all of the blocks of each subsystem are treated as a single execution unit by the model execution engine, i.e., the two subsystems are atomic, and (2) a checksum calculation performed on each subsystem yields the same result.

A suitable technique for computing checksums for subsystems of a graphical model is described in U.S. Pat. No. 7,178,112, issued Feb. 13, 2007 for Management of Functions for Block Diagrams.

In some embodiments, Gain blocks having different gain values (i.e., different block parameters) may still be shared. In particular, the Gain blocks of the source model may be replaced with a combination of Constant and Multiplier blocks where the Constant is set to the Gain block's gain parameter. If the resource sharing optimizer 234 determines that the Constant blocks are the same, then the pairs of Constant and Multiplier blocks may be collapsed back into Gain blocks and shared. If the Constant blocks are not the same, then the resource sharing optimizer 234 may share the Multiplier blocks.

The resource sharing optimizer 234 may partition the subsystem, s, being optimized into smaller regions where each region has exactly N=SharingFactor number of equivalent resources, as indicated at line 602. For each subsystem, s, the resource sharing optimizer 234 may create a sorted list of nodes, as indicated at line 604, and perform As Soon As Possible (ASAP) scheduling, as indicated at segment 606. It should be understood that other scheduling techniques, such as As Late As Possible (ALAP) scheduling and force-directed scheduling, may be used.

The resource sharing optimizer 234 may insert delay lines, as indicated at line 608. The resource sharing optimizer 234 may insert a local counter and configure it, as indicated at line 610. The resource sharing optimizer 234 may restructure the subsystem s', e.g., optimize it, to use only one resource, as indicated at segment 612 (FIG. 6B). The restructuring of the subsystem s' may include adding one or more new blocks or nodes, such as a data unbuffer block, as indicated at line 614, and a hardware demux block, as indicated at line 616. In addition, the resource sharing optimizer 234 may replace one or more blocks of the subsystem s of the original source model. For example, the resource sharing optimizer 234 may replace a unit-delay block, n, within a feedback loop, with a unit-delay enabled block connected to logic that controls when the unit-delay block is active, as indicated at line 618. The resource sharing optimizer 234 may set the latency of the optimized subsystem s' to the SharingFactor−1, as indicated at line 620. Latency may be evaluated as described herein at line 1412 of FIG. 14A.

In some embodiments, the resource sharing optimizer 234 also may modify any state-holding blocks, such as Delay blocks, of the subsystem. More specifically, for each Delay block of the subsystem, where the delay is given by $Z^{-k}$, where k is the number of steps, e.g., time steps or sample periods, of delay implemented by the block, the resource sharing optimizer 234 may modify the amount of delay being implemented by the Delay block to:

$Z^{-k*Sf}$ where k is the number of steps of delay of the original Delay block, and Sf is the user-specified streaming factor.

Figure 7:
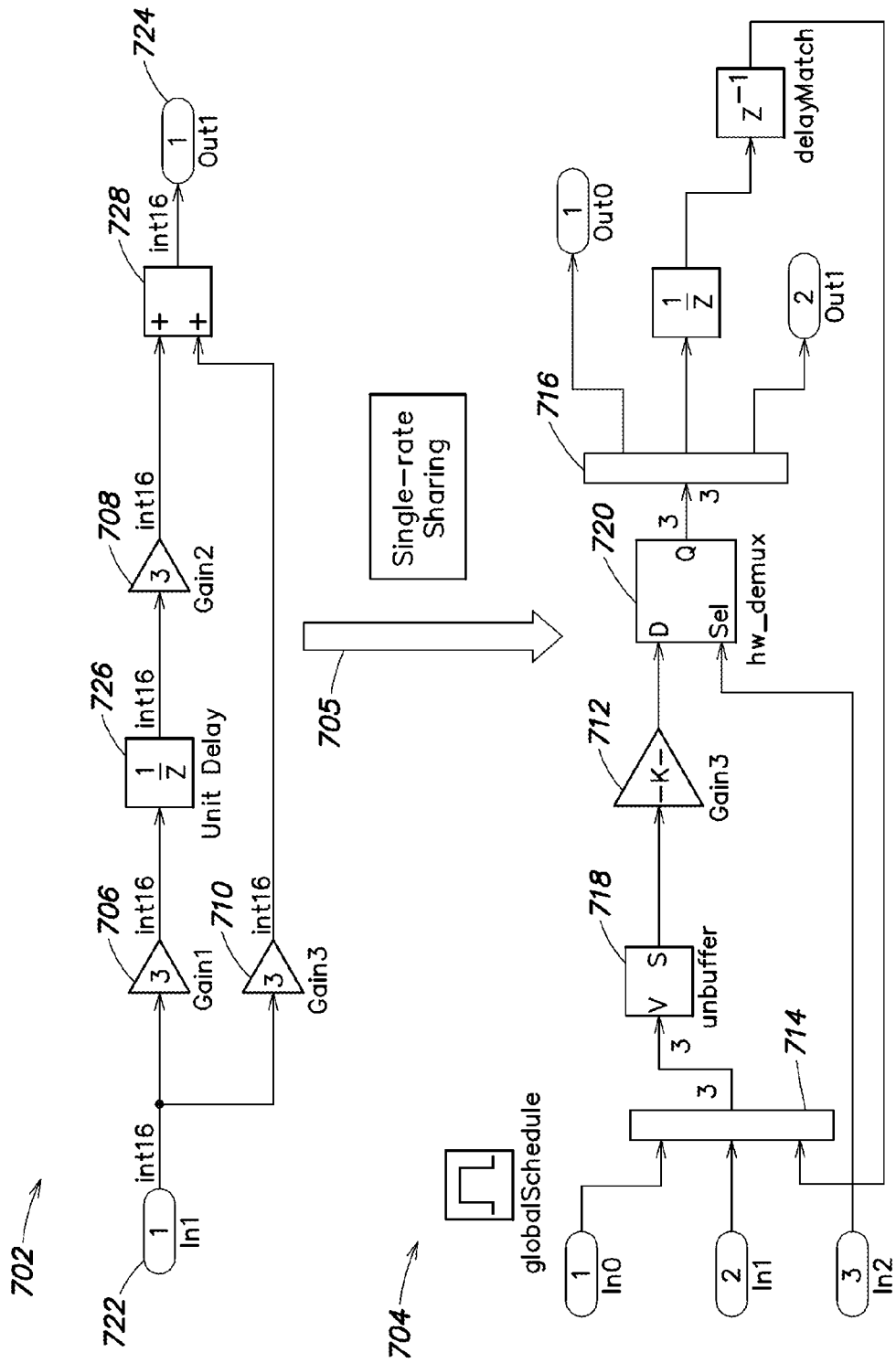
FIG. 7 is a schematic illustration of a subsystem of an original source model being converted into a resource sharing optimized subsystem in accordance with embodiments of the present disclosure.

FIG. 7 is a schematic illustration of a subsystem 702 of an original source model being converted into a resource sharing optimized subsystem 704, as indicated by arrow 705. The original subsystem 702 includes three Gain blocks, Gain1 706, Gain2 708, and Gain3 710 each having a Gain value of '3'. The original subsystem 702 further includes an Inport (In1) block 722, an Outport (Out1) block 724, a Unit Delay block 726 and an Add block 728. The three Gain blocks 706, 708, and 710 of the source model 702 are replaced with a single shared Gain block 712 in the optimized subsystem 704. The optimized subsystem 704 also includes a Mux block 714, a Demux block 716, a Data Unbuffer block 718, and a Hardware Demux block 720, among other newly added blocks.

Figure 8:
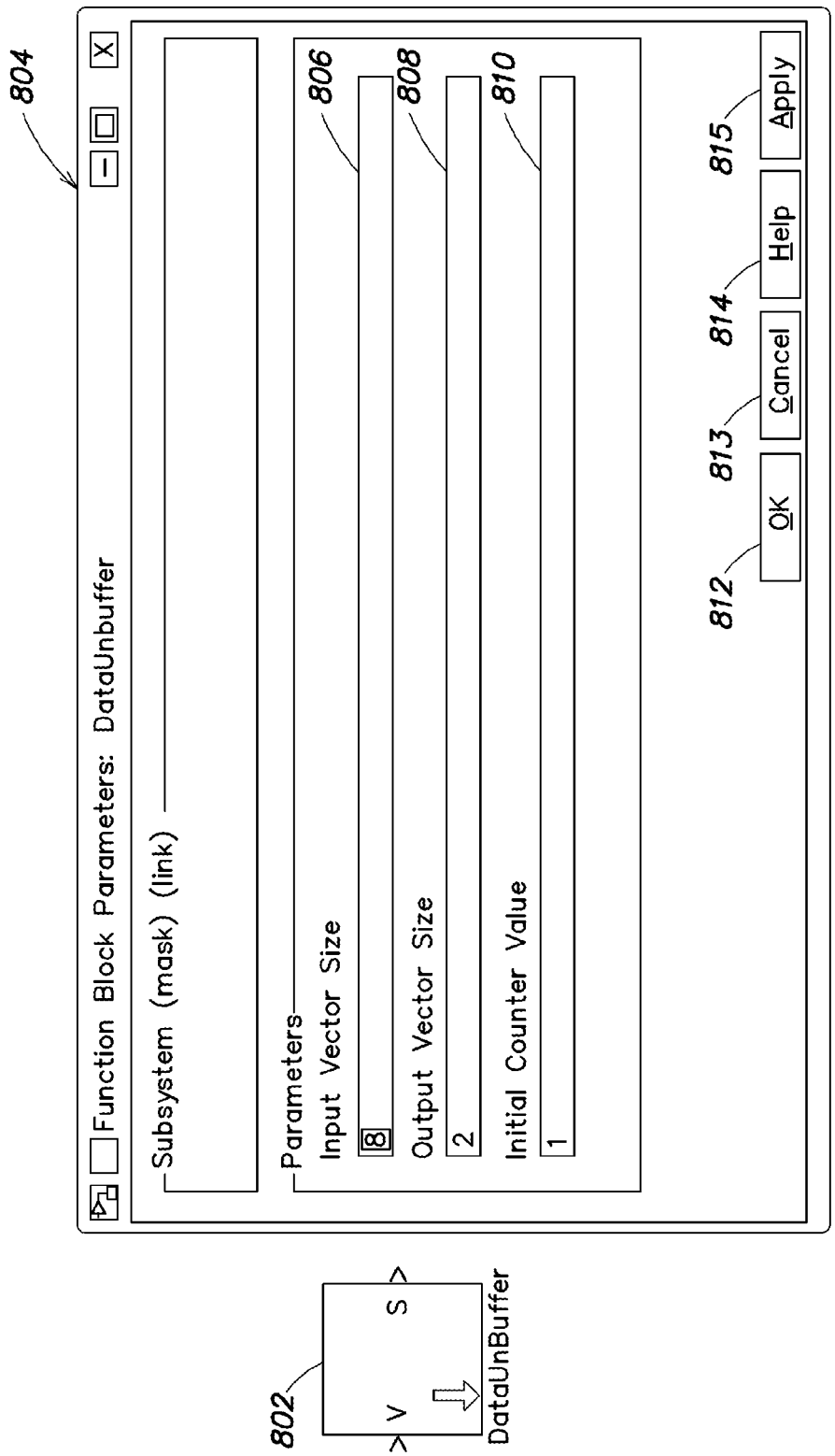
FIG. 8 is a schematic illustration of a Data Unbuffer block and a property setting pane in accordance with embodiments of the present disclosure.

FIG. 8 is a schematic illustration of a Data Unbuffer block 802, and a property setting pane 804, such as a mask, for the Data Unbuffer block 802. That is, the Data Unbuffer block 802 may be a masked subsystem. A masked subsystem is a subsystem whose contents are locked from viewing and editing. When a masked subsystem is opened, instead of seeing the contents of the subsystem, a dialog may appear that 'masks' the contents of the subsystem component. The dialog may provide instructions for user interaction with the masked subsystem. The mask 804 for the Data Unbuffer block 802 includes a plurality of data entry boxes through which a user may specify parameter values for the respective instances of the Data Unbuffer block 802. In particular, the mask 804 includes an 'Input Vector Size' data entry box 806 whose value has been set to eight (8), an 'Output Vector Size' data entry box 808 whose value has been set to two (2), and an 'Initial Counter Value' data entry box 810 whose value has been set to one (1). The mask 804 also includes a plurality of command buttons, such as OK, Cancel, Help and Apply command buttons 812-815 for use in accepting, rejecting or applying values entered in the data entry boxes 806-810, or for use in obtaining help information.

The following is a description of the operation of the Data Unbuffer block in accordance with some embodiments. The functional description is provided in the MATLAB programming language.

Data-Unbuffer
Inputs: Data—vector of size N
Outputs: SerialOut—scalar or vector of size M
Parameters:
Input Vector Size: N
Output Vector Size: M
Initial Counter Value: CountInit
Constraints (Pre-Conditions):
  1. N>M and mod(N, M)==0, i.e., N is wholly divisible by M.
  2. 1<=CountInit<=(N−M+1)
Functionality:
  Chop up the input vector in to 'K' chunks, where N=k*M, and therefore, each chunk is a vector of size M.
  Starting from 'CountInit' as index, stream out each chunk as output over the period of K cycles.
  MATLAB code of functionality:

```
function dout=data_unbuffer(din, N, factor, IC)
% din: input data
% N: parameter, input vector size
% factor: parameter, output vector size
% IC: CounterInit
inLen=length(din);
if inLen==1
    dout=din;
    return;
end
[mdim, ndim]=size(din);
din=cast_to_fi(din);
persistent ctr;
if isempty(ctr)
    ctr=int32(IC);
end
data=reshape(din, mdim*ndim, 1);
if ctr>1
    for i=1:factor:ctr−1
    data(1:N-factor)=data(factor+1:N);
    data(N-factor+1:N)=zeros(1, factor);
    end
end
dout=data(1:factor);
ctr=ctr+factor;
if ctr >N
    ctr=int32(1);
end
end
```

Figure 9:
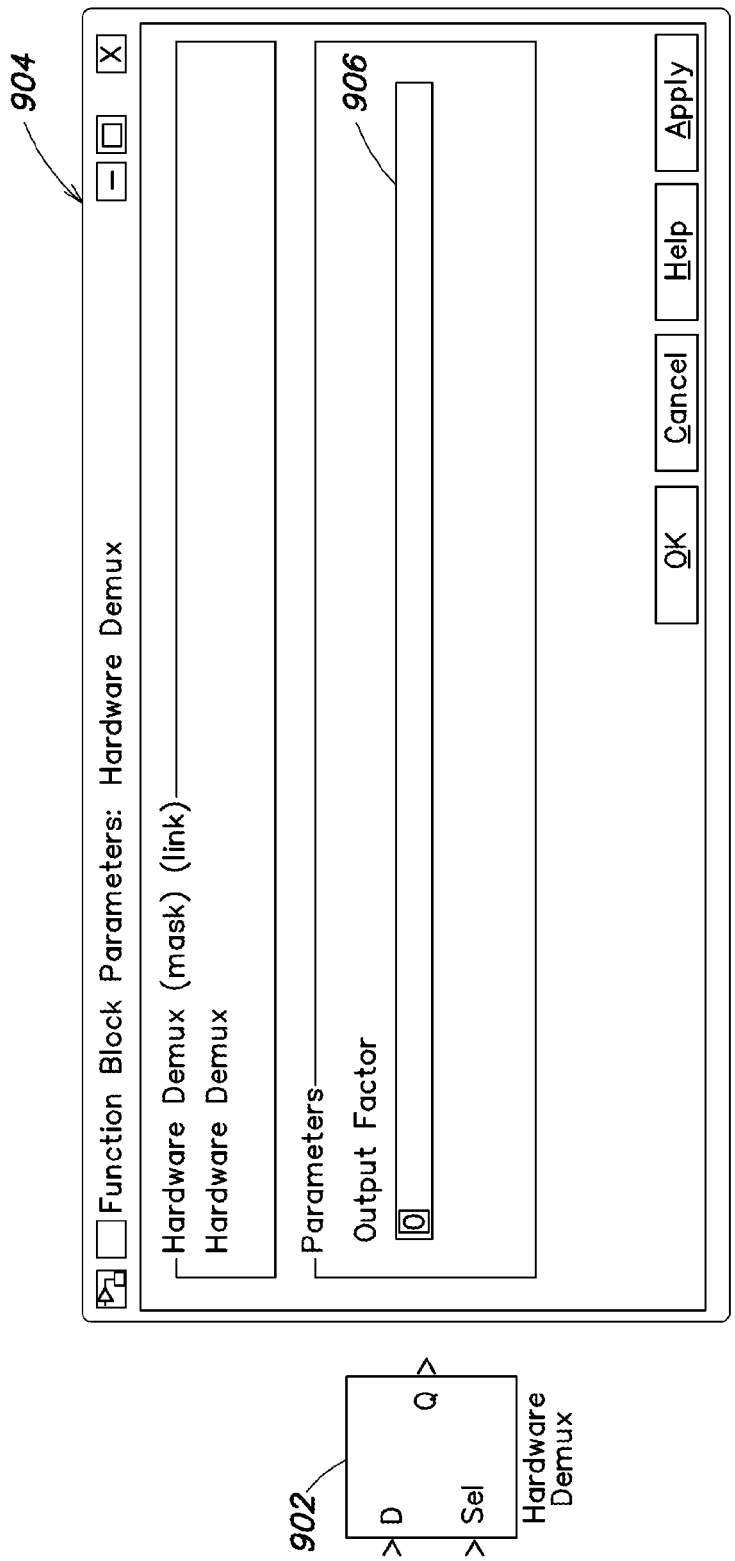
FIG. 9 is a schematic illustration of a Hardware Demultiplexor (Demux) block and a property setting pane in accordance with embodiments of the present disclosure.

FIG. 9 is a schematic illustration of a Hardware Demultiplexor (Demux) block 902, and a property setting pane 904, e.g., a mask, for the Hardware Demux block 902. The mask 904 includes an 'Output Factor' data entry box 906 through which a user may specify a desired output factor value, e.g., zero (0). The following is a description of the operation of the Hardware Demux block. The functional description is provided in the MATLAB programming language.

Hardware Demux
Inputs: (1) Data of size M
(2) Select: scalar integer
Outputs: BufferedOut—vector of size N, where N is wholly divisible by M
Parameters:
Output Factor: K, such that N=K*M
Constraints (pre-conditions):
1. N>M and mod(N, M)==0, i.e., N is wholly divisible by M.
2. 1<=Select<=K
Functionality:
1. Output is a vector created by concatenating 'K' chunks of data.
2. Input data forms the i-th chunk of data, where i is the value of the Select input
3. All other data maintain their previous state (initially everything is 0).
function y=hwdemux(u, ctr, factor)
% u: input data
% ctr: select data
% factor: parameter, 'K'
persistent yreg;
if isempty(yreg)
   yreg=zeros(u, factor);
end
y=yreg;
len=length(u);
if len==1
   y(int32(ctr)+1)=u;
else
   rowidx=int32(ctr)*len;
   for ii=1:len
   y(rowidx+ii)=u(ii);
   end
end
yreg=y;
end Local Streaming Phase FIG. 10 is a pseudo code diagram of a method of performing local streaming in accordance with some embodiments of the disclosure.

For each Inport of the subsystem that is an N-sized vector, the streaming optimizer 232 may insert a new node in the PIR that represents a Data Unbuffer block, as indicated at line 1002. Depending on the specified streaming factor (Sf), the output of the Data Unbuffer block may be a scalar, or the output may be a vector having a smaller size, e.g., smaller width, than the input vector.

The input of a Data Unbuffer block may be multi-dimensional, for example, it may have two dimensions. The multi-dimensional input may be a frame. Each of the dimensions may have a size, and the size of the combined data stored may account for all elements in the multi-dimensional input or may be less. For example, in a sparse representation, certain values such as 0 may not be explicitly stored. The output of the Data Unbuffer block may be multi-dimensional where the size of each of the dimensions is less than or equal to the respective dimensions of the input or where the size of the combined output data is less than the size of the combined input data.

After modifying the Inport blocks of the subsystem, the streaming optimizer 232 may analyze the interior blocks of the subsystem, i.e., the function blocks located in between the subsystem's Inports and Outports. For each such interior block of the subsystem, e.g., a target block, if the output of the block is a vector, then the streaming optimizer 232 may change the size of the output, e.g., either to a scalar or to a vector of smaller width. The output size may be computed by the streaming optimizer 232 as a function of the user-specified streaming factor (Sf). For example, as with the subsystem's Inport blocks, if the output of an interior block is a 40-element vector, and the streaming factor is 40, then the streaming optimizer 232 may modify the interior block to output a scalar. If the output is a 40-element vector, but the streaming factor is eight, then the streaming optimizer 232 may modify the block to output a five-element vector.

The streaming optimizer 232 also may modify any state-holding blocks, such as Delay blocks, of the subsystem, as indicated at line 1006. Specifically, because the streaming optimization procedure interleaves the computation between parallel threads of execution, Delay blocks may be expanded by the streaming optimizer 232 to hold data from each thread of computation. More specifically, for each Delay block of the subsystem, where the delay is given by $Z^{-k}$, where k is the number of steps, e.g., time steps or sample periods, of delay implemented by the block, the streaming optimizer 232 may modify the amount of delay being implemented by the Delay block to:

$Z^{-k*Sf}$ where k is the number of steps of delay of the original Delay block, and Sf is the user-specified streaming factor.

For each Outport of the subsystem that is an N-sized vector, the streaming optimizer 232 may insert a Hardware Demux block into the subsystem, as indicated at line 1004. The input and output of the Hardware Demux block may have different dimensions. The size of each of the dimensions of the output may be less than or equal to the size of the respective dimensions of the input. The dimensions of the input and output may be different. For example, the input may be scalars of one dimension with size one and the output may be of two dimensions both with size two. The input or output may be frames.

The streaming optimizer 232 also may insert matching delays on output ports, as indicated at line 1008, and may set the latency of the optimized subsystem to the Streaming-Factor−1, as indicated at line 1010. Again, latency may be evaluated as described herein at line 1412 of FIG. 14.

Figure 11:
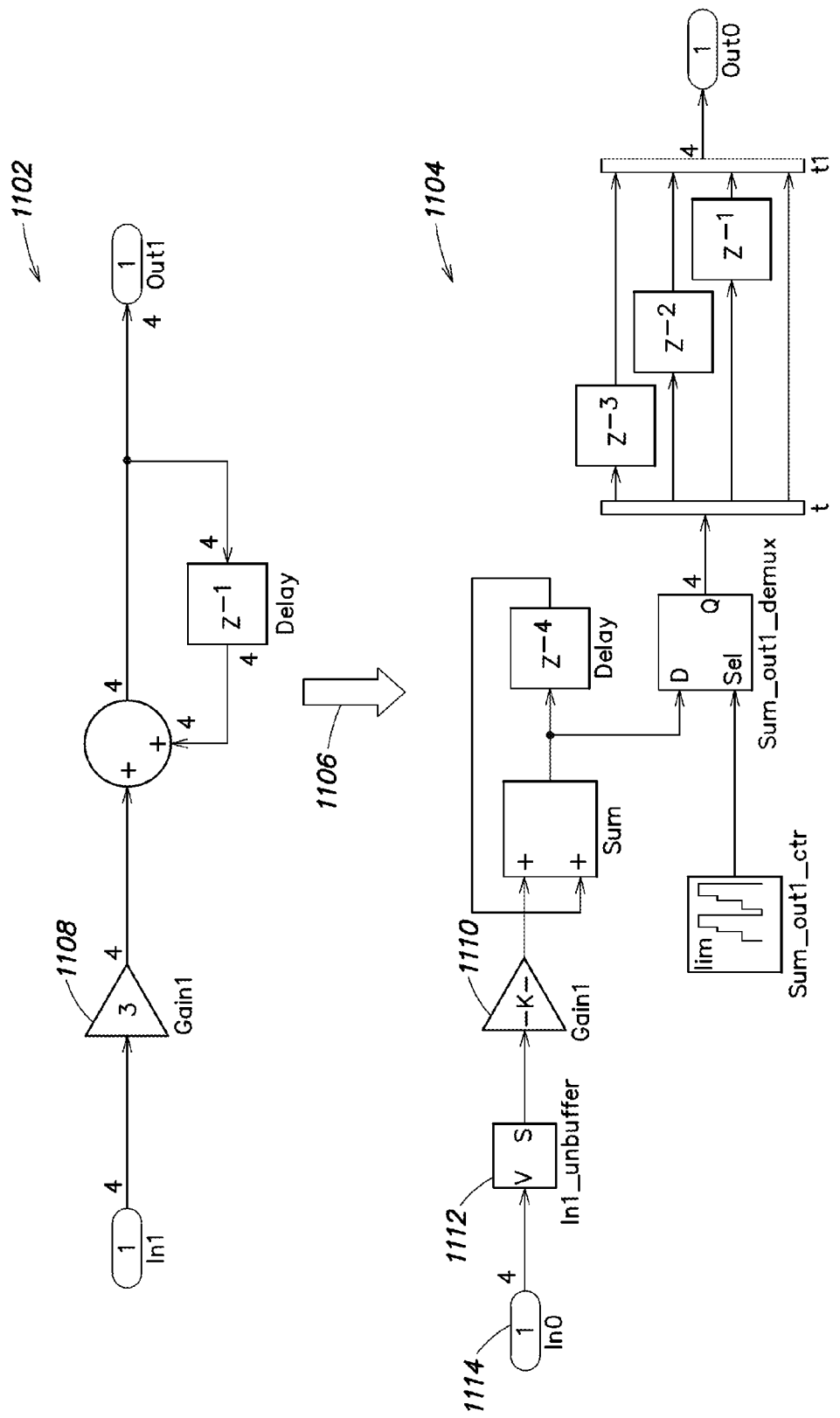
FIG. 11 is a schematic illustration of a subsystem of an original source model being converted into a streaming optimized subsystem in accordance with embodiments.

FIG. 11 is a schematic illustration of a subsystem 1102 of an original source model being converted into a streaming optimized subsystem 1104, as indicated by arrow 1106. The original subsystem 1102 includes a Gain block 1108 whose input data is a 4-element vector. The optimized subsystem 1104 includes a Gain block 1110 whose input data is a scalar. More specifically, the optimized subsystem 1104 includes a data unbuffer block 1112 that converts the 4-element vector from an Inport block 1114 to a scalar.

Local Sharing Plus Streaming Phase

FIG. 12 is a pseudo code diagram of a method of performing local sharing plus streaming in accordance with some embodiments of the disclosure. The resource sharing optimizer 234 may perform a resource sharing transformation as described herein, as indicated at line 1202. The streaming optimizer 232 may perform a streaming transformation as described herein, as indicated at line 1204. However, when performing both sharing and streaming optimizations on a subsystem, the optimization engine 228 may create a counter that is configured to count from zero (0) to (StreamingFactor*SharingFactor)−1 whose output may be called 'ShareStreamCount', as indicated at line 1206. In addition, the optimization engine 228 may connect the counter to the enable input of an enabled subsystem with the following additional logic mod(ShareStreamCount, StreamingFactor)==0, as indicated at line 1208. In addition, if there is a delay $Z^k$, it may be transformed differently depending on whether it is contained in the shared subsystem or not, as indicated at line 1210. If the delay is contained inside the shared subsystem, then it may be transformed to a delay whose delay length is $Z^{(k*(Sh*St))}$, where Sh=Sharing Fact and St=Streaming Factor. If the delay is not contained inside the shared subsystem, then the delay may be expanded to $Z^{(k*St)}$.

Sharing Resources in Feedback Loops

Figure 13A:
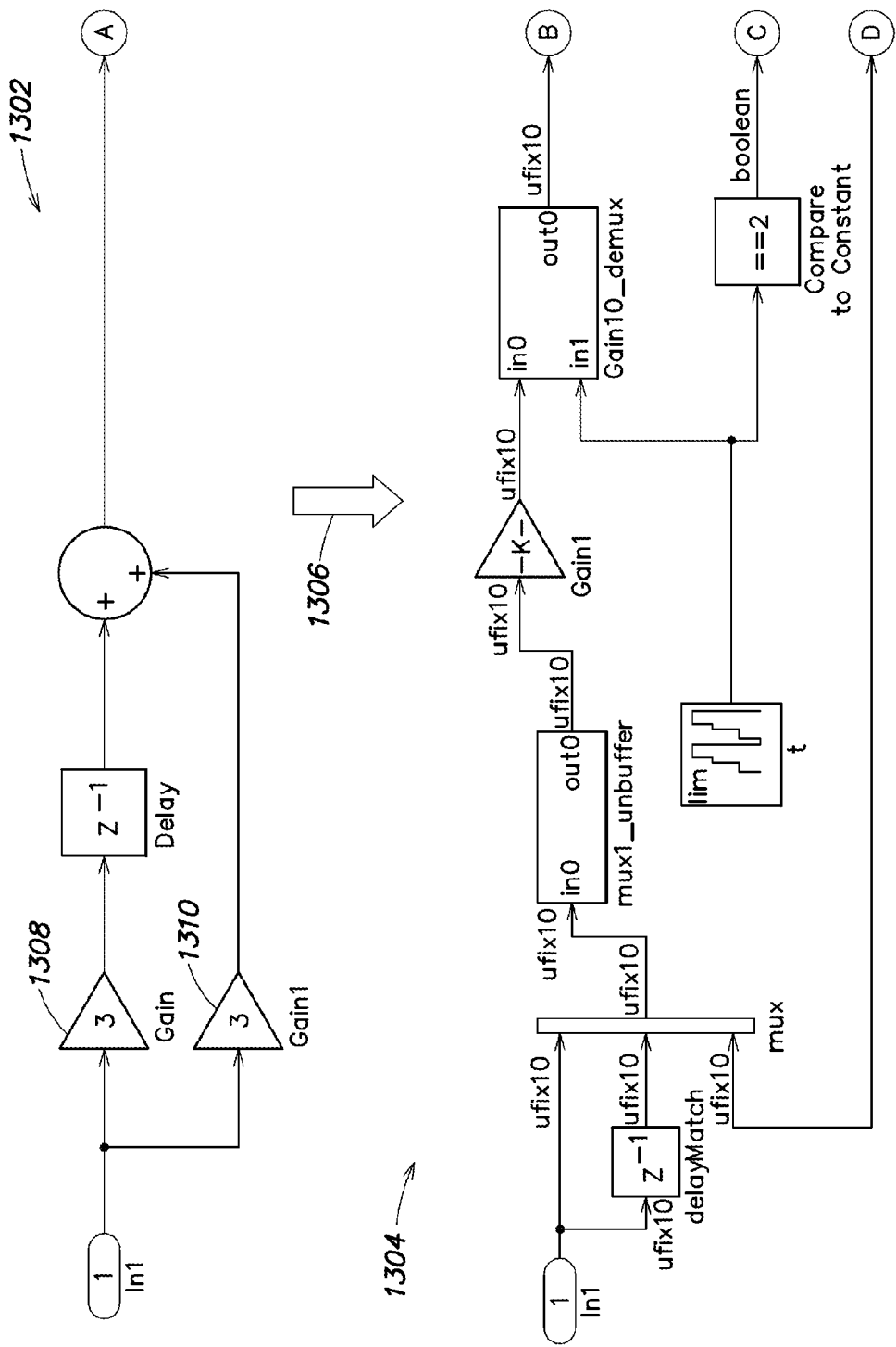
FIGS. 13A and 13B are partial views of a schematic illustration of a subsystem having a feedback loop being converted into an optimized subsystem in accordance with embodiments of the present disclosure.
Figure 13B:
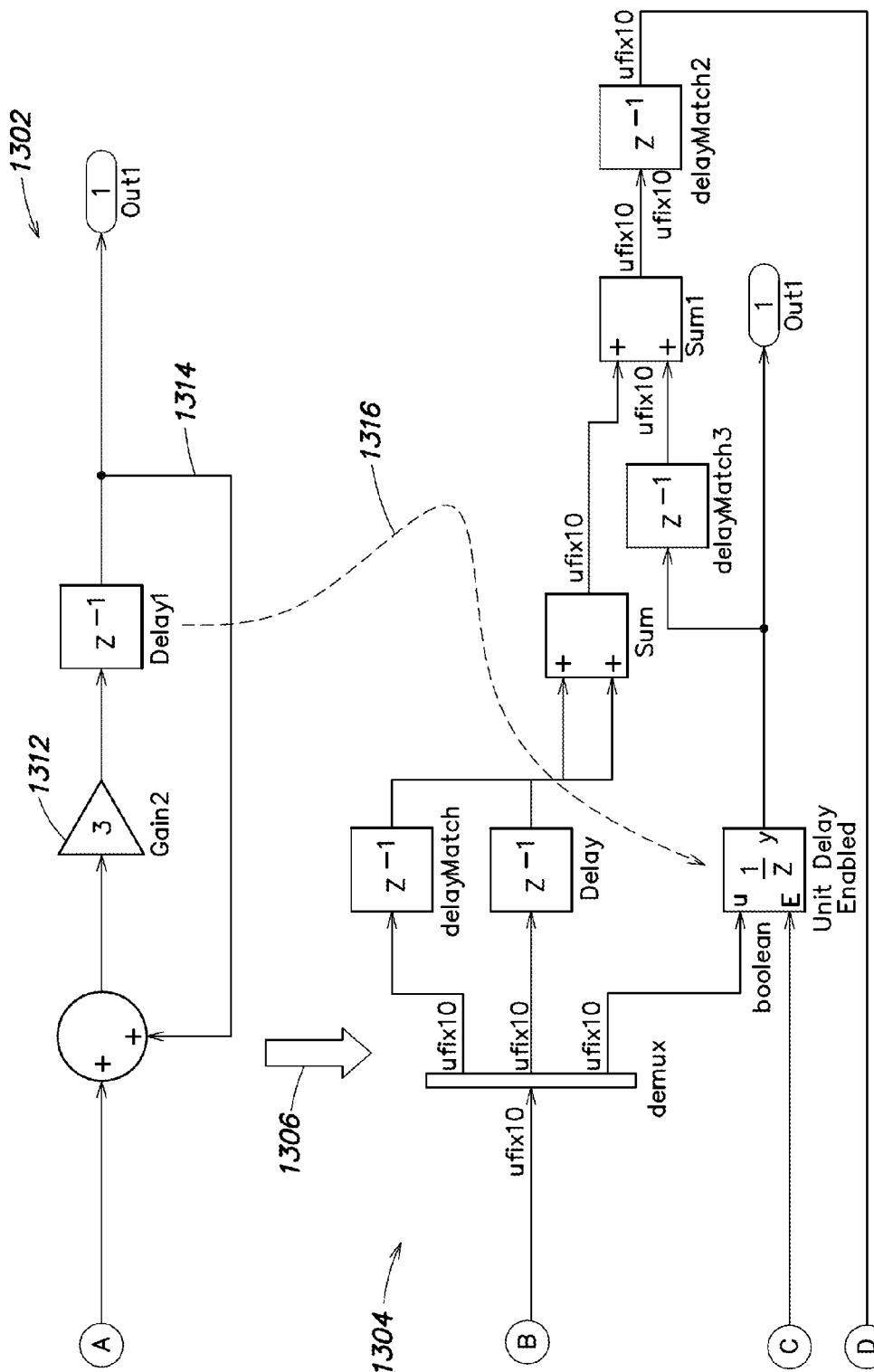

FIG. 13 is a schematic illustration of a subsystem 1302 of an original source model being converted into a resource sharing optimized subsystem 1304, as indicated by arrow 1306. The original subsystem 1302 includes three Gain blocks 1308, 1310, and 1312, and a feedback loop 1314 at the third Gain block 1312. In the optimized system 1304, the delay in the feedback loop 1314 is enabled in the cycle, e.g., simulation step, scheduled, as indicated by dashed arrow 1316.

Delay Balancing/Global Scheduling Phase

One result of optimizing the one or more subsystems of the source model 125 may be the introduction of latencies or delays in one or more data paths through the model subsystems. If a latency or delay is introduced in a first path in a given subsystem, and this first path merges with a second path for which no (or a different) delay was introduced, then the signals or data represented by these two paths may no longer be aligned with each other. Such a mismatch or misalignment may result in incorrect results being produced if the modified model was to be executed, or if code, generated from the modified model, was to be run.

FIGS. 14A and 14B are partial views of a pseudo code diagram of a method in accordance with some embodiments of the disclosure. In some embodiments, the delay balancing engine 236 may evaluate the PIR as it is being modified, to identify and account for, e.g., correct, such latencies or delays automatically, as indicated at section 1402. The delay balancing engine 236 may be configured to ensure that merging paths remain aligned with each other as specified in the source model.

In some embodiments, the delay balancing engine 236 may automatically insert one or more Delay blocks in the source model, and may configure the inserted Delay blocks to return the data paths back into time-wise alignment. In particular, for all input ports 'n' of the source model 125, the delay balancing engine 236 may set the scheduled time step as SchedStart(n)=SchedEnd(n)=0, as indicated at line 1404. The delay balancing engine 236 may then walk the graph of the source model 125 in reverse topological sorted order, as indicated at line 1406, and, for each node, compare SchedEnd(i) values for each input T, and set SchedStart(n)=the max of SchedEnd(i) for all inputs, as indicated at line 1408. On each input, k, the delay balancing engine 236 may insert SchedStart(n)—SchedEnd(k) delays, as indicated at line 1410. The delay balancing engine 236 may then set SchedEnd(n)=SchedStart(n)+Latency(n), as indicated at line 1412.

That is, the delay balancing engine 236 may sum the delays introduced along each path in the respective subsystem as a result of the optimizations being performed. At each join point, i.e., at each point where two paths merge together, the delay balancing engine 236 may compare the sum of delays on each path to determine if they are equal. If the sum of delays is not equal along the merging paths, then the delay balancing engine 236 may insert a Delay block into the path having less delay than the other paths, and may configure the inserted Delay block so that the sum of delays along he merging paths is equal at the join point being evaluated. The inserted Delay block also may be configured to operate at the same rate as the other signals at the join point being evaluated. This process may be repeated at the join points in the respective subsystem to ensure that the data remains aligned as specified in the original source model 300.

In some embodiments, the delay balancing engine 236 may consider each edge of the modified PR. Each edge may correspond to a signal, data or control path of the modified model. An edge being evaluated may extend between a source or driver block and a destination or receiver block. The delay balancing engine 236 may evaluate the other edges that join at the same receiver block as the subject edge, and determine the value of the maximum or highest latency at these other edges. In addition, the delay balancing engine 236 may determine the delay, if any, introduced by the source block for the subject edge. The delay balancing engine 236 may compute the difference between the determined maximum latency and the latency introduced at the subject edge's source block. If the computed difference is greater than zero, the delay balancing engine 236 may insert a Delay block into the subject edge, i.e., between the source and destination blocks. The delay balancing engine 236 also may configure the inserted Delay block so that it provides a delay that aligns the latencies introduced at the destination block, for example, by choosing a delay that is equal to the computed difference.

In some embodiments, the delay balancing engine 236 may also be configured to consider the rate at which delays are introduced along the edges of the modified PR. For example, suppose a single delay at a rate of five (5) is introduced on a first edge, and a single delay of rate ten (10) is introduced on a second edge. While the number of delays along these two edges is equal, i.e., they are both one (1), the delays are not aligned because of a rate mismatch (5 vs. 10). The delay balancing engine 236 may normalize the rates of delays before comparing them. The single delay at rate five (5) may be translated to a delay of two (2) units at rate ten (10). Upon normalizing the rates, a mismatch is now identified by the delay balancing engine 236. In this case, the delay balancing engine 236 may add a single delay at rate ten (10) to the second edge.

In some embodiments, the functionality performed by the delay balancing engine 236 may be selectively disabled and enabled, e.g., by the user, as desired. The functionality may be disabled or enabled by setting a property, such as a BalanceDelays property of the code generation process, to 'on' or 'off'. If the delay balancing engine 236 is disabled, then the user may manually account for the introduction of any delays into the source model.

The optimization engine 228 may perform one or more additional optimizations, such as distributed pipelining, retiming, etc., as indicated at line 1414.

Next, the optimization engine 228 may perform a global scheduling phase, as indicated at line 1416. In particular, the global scheduler 238 may insert one or more global counters into the source model 125, and may configure the one or more global counters to count, e.g., from zero to Max Computation Latency–1, as indicated at line 1418. The output of the one or more global counters may be referred to as 'GlobalCtr'.

The global scheduler 238 may determine which subsystems and other elements of the source model, such as blocks, Stateflow charts, etc., may be encapsulated into enabled subsystems, e.g., conditional execution subsystems. More specifically, the global scheduler may identify a set of nodes from the in-memory graph, called 'ScheduleUnits', that includes each subsystem, 's', that has undergone sharing, streaming, or both sharing and streaming optimizations during the local phase, as indicated at line 1420. The global scheduler 238 may further include in the 'ScheduleUnits' node set each node 'n' such that SchedStart(n) does not equal SchedEnd(n), as indicated at line 1422. In addition, the global scheduler 238 may include in the 'ScheduleUnits' node set the coarsest grained subsystems s' such that s' contains no nodes or subsystems from the prior two lines (1420, 1422), as indicated at line 1424. Line 1424 consolidates a sub-graph of nodes that do not contain any nodes from line 1422 into one coarse sub-graph. This way, other optimizations, such as retiming, may be run within the confines of this coarse sub-graph. Once a node becomes a member of ScheduleUnits, it may not be moved around because, by definition, it is scheduled for execution at a given time step. However, within the coarse sub-graph, a time range is defined in which to execute the coarse sub-graph. This means that there may be more freedom to move nodes within this sub-graph to achieve other optimizations, such as retiming and distributed pipelining. Finally, the global scheduler may include in the 'ScheduleUnits' node set any node, n, that is not part of one of the above three lines (1420, 1422, 1424) that includes persistent state logic, such as delay blocks, Stateflow charts, etc., as indicated at line 1426.

For each node that is a member of the 'ScheduleUnits' node set, the global scheduler 238 may encapsulate the node in a conditional execution subsystem, as indicated at line 1428. An enabled subsystem is a subsystem having a control input, and the subsystem executes at each simulation step for which the control signal has a positive value. The control input may be a scalar or a vector. If the control input is scalar, the subsystem executes at each simulation step for which the input value is greater than zero. If the control input is a vector, the subsystem executes for each simulation step for which any one of the vector elements is greater than zero. A suitable conditional execution subsystem is an enabled subsystem as described in the product manual *Using Simulink* from The MathWorks, Inc. (September 2012).

Figure 15:
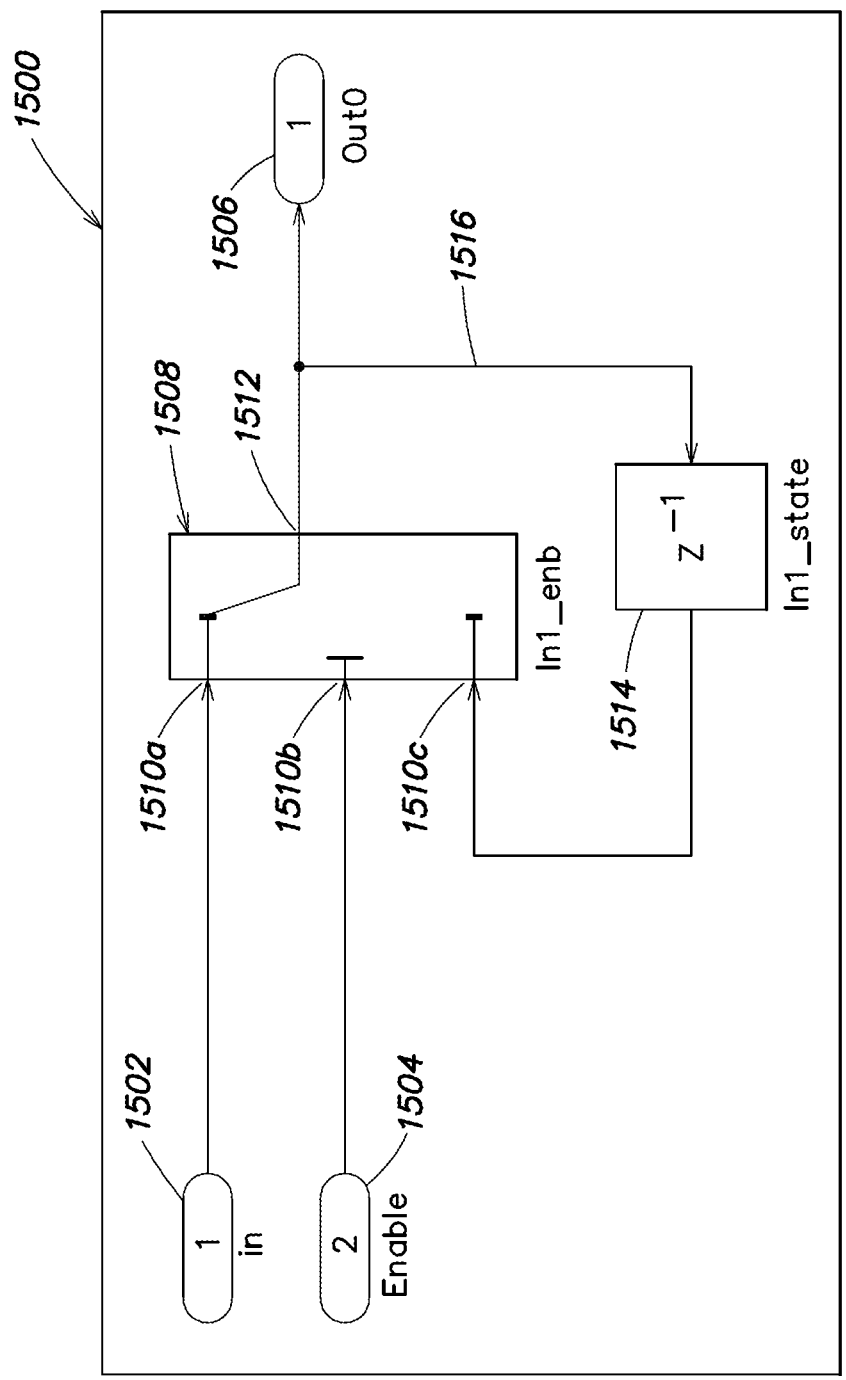
FIG. 15 is a schematic illustration of bypass logic in accordance with embodiments of the present disclosure.

The global scheduler 238 may insert a bypass register on all inputs to the nodes of the 'ScheduleUnits' node set, as indicated at line 1430. The bypass register may be configured to keep the inputs stable during the active execution phase. FIG. 15 is a schematic illustration of exemplary bypass logic 1500, which may be implemented as a subsystem. The bypass logic 1500 may include a first (in) Inport block 1502, a second (Enable) Inport block 1504, and an Outport (out0) block 1506. The bypass logic 1500 further includes a Switch block 1508 having three inputs 1510*a-c*, and an output 1512. The Switch block 1508 may be configured to pass to the output 1512 the value of the first input 1510*a* or the value of the third input 1510*c* based on a value of the second input 1510*b*. The first and second Inport blocks 1502, 1504 may be connected to the first and second inputs 1510*a*, 1510*b* of the Switch block 1508. The bypass logic 1500 also may include a Delay block 1514 within a feedback loop 1516 between the output 1512 of the Switch block 1508 and the third input 1510*c* of the Switch block 1508. The Delay block 1514 may be configured to delay the release of the input by a specified 'Delay length' parameter of the Delay block 1514. The 'Delay length' parameter for the Delay block 1514 may be set to one (1). The output 1512 of the Switch block 1508 also may be connected to the Outport block 1506.

The global scheduler 238 may compute enable logic, and may insert this enable logic between the one or more global counters and the control input to each enabled subsystem to control the respective enabled subsystem to execute at the appropriate simulation steps, as indicated at section 1432. Specifically, the global scheduler 238 may let
ModStart(n)=mod(SchedStart(n), MCI), and
ModEnd(n)=mod(SchedEnd(n), MCI), as indicated at line 1434.

ModStart and ModEnd may be symbolic names to represent the scheduled start and end times of a node 'n' after a modulo operation has been applied to them. For example, if SchedStart(n)=5 and MCI=3, then ModStart(n)=mod(5, 3)=2. If SchedEnd(n)=18 and MCI=7, then ModEnd(n)=mod(18, 7)=4. The modulo operation (mod) is the remainder after dividing the first argument by the second argument.

If ModStart(n)<ModEnd(n), then the global scheduler 238 may set the enable logic for the respective subsystem n as:
EnableLogic(n)=(GlobalCtr>=ModStart(n) AND GlobalCtr<ModEnd(n), as indicated at line 1436.

Otherwise, the global scheduler 238 may set the enable logic for the respective subsystem n as:
EnableLogic(n)=(GlobalCtr>=ModStart(n)) OR (GlobalCtr<ModEnd(n)), as indicated at line 1438.

Once the appropriate enable logic has been determined, model elements, such as blocks (e.g., logic blocks, such as AND and OR blocks), corresponding to the determined enable logic are added to the source model and connected between the output of the one or more global counters and the control input of the respective enabled subsystem, as indicated at line 1440. For a node 'n', if ModStart(n)>ModEnd(n), then the initial value of certain blocks within 'n' may be set to MCL−ModStart(n), as indicated at line 1442. Blocks whose initial value is changed may include counters and Data unbuffer blocks.

As shown, the optimization engine creates an optimized version of the source model, as indicated at line 1444. The optimized version may, at least initially, be an in-memory graph or IR.

In some embodiments, the code generation system 200 may be configured to create a validation model corresponding to the optimized version of the source model, and may construct an environment to compare the outputs of the source model to this validation model to confirm correct operation of the validation model, e.g., to the user, as indicated at section 1446.

Specifically, the code generation system 200 may create a new model that includes both the source model and the optimized model, as indicated at line 1448. The graphical model generator 224 may create the optimized model from the in-memory graph or IR. The new model may be configured to send the same inputs to both the source model and the optimized model, as indicated at line 1450. The new model may include a counter element, e.g., a counter block, configured to count from zero to the MCL−1, as indicated at line 1452. The original source model may be placed within an enabled subsystem, and the input control may be connected to logic that checks that the output of the counter created at line 1452 is equal to zero, as indicated at line 1454. The outputs from both the original model and the optimized model may be collected, as indicated at line 1456. Compensating delay lines may be added to the outputs of the optimized model, as indicated at line 1458, and downsamples may be added to the outputs of the original source model, as indicated at line 1460.

The new model may be run (causing the original source model and the optimized model to be executed) and the output values from the two models may be compared to confirm that the optimized model produces the same outputs as the original source model, as indicated at line 1462.

The validation model produced by the graphical model generator 224 may be presented to the user for evaluation, e.g., on display 120. The report generator 230 may be directed to produce a report that describes or lists the resources that would be required to implement the optimized model in hardware. For example, a user-settable parameter may be asserted, e.g., set to 'on', that causes the report generator 230 to generate a hardware resource report upon creation of the modified in-memory graph and/or validation model. Alternatively, the user may operate the GUI to direct the report generator 230 to create the report. The hardware resource report may be presented to the user, e.g., on the display 120. It may also be saved in memory and/or printed.

If the user is satisfied with the operation of the optimized model, and with the resource savings achieved by the optimizations, the modified in-memory graph may be used to generate optimized hardware description code, as indicated at line 1464. More specifically, the back-end processing unit 226 may interface with the IR generator 222 to generate optimized hardware description code from the modified in-memory graph. This optimized hardware description code may be converted into a serial bit stream for synthesizing target hardware, such as an FPGA, Application Specific Integrated Circuit (ASIC), Complex Programmable Logic Device (CPLD), or other target programmable logic device.

Suitable simulation, synthesis, and layout tools include the ModelSim simulation and debug environment from Mentor Graphics Corp of Wilsonville, Oreg., the Vivado tool from Xilinx, Inc. of San Jose, Calif. and the QSys system integration tool from Altera Corp. of San Jose, Calif., as well as synthesis tools from Synopsys, Inc. of Mountain View, Calif., Cadence Design Systems, Inc. of San Jose, Calif., and Microsemi Corp. of Aliso Viejo, Calif. (formerly Actel Corp.).

It should also be understood that the order of lines shown in FIGS. 14A and 14B may be changed. It should also be understood that one or more lines may be removed or added.

Figure 16A:
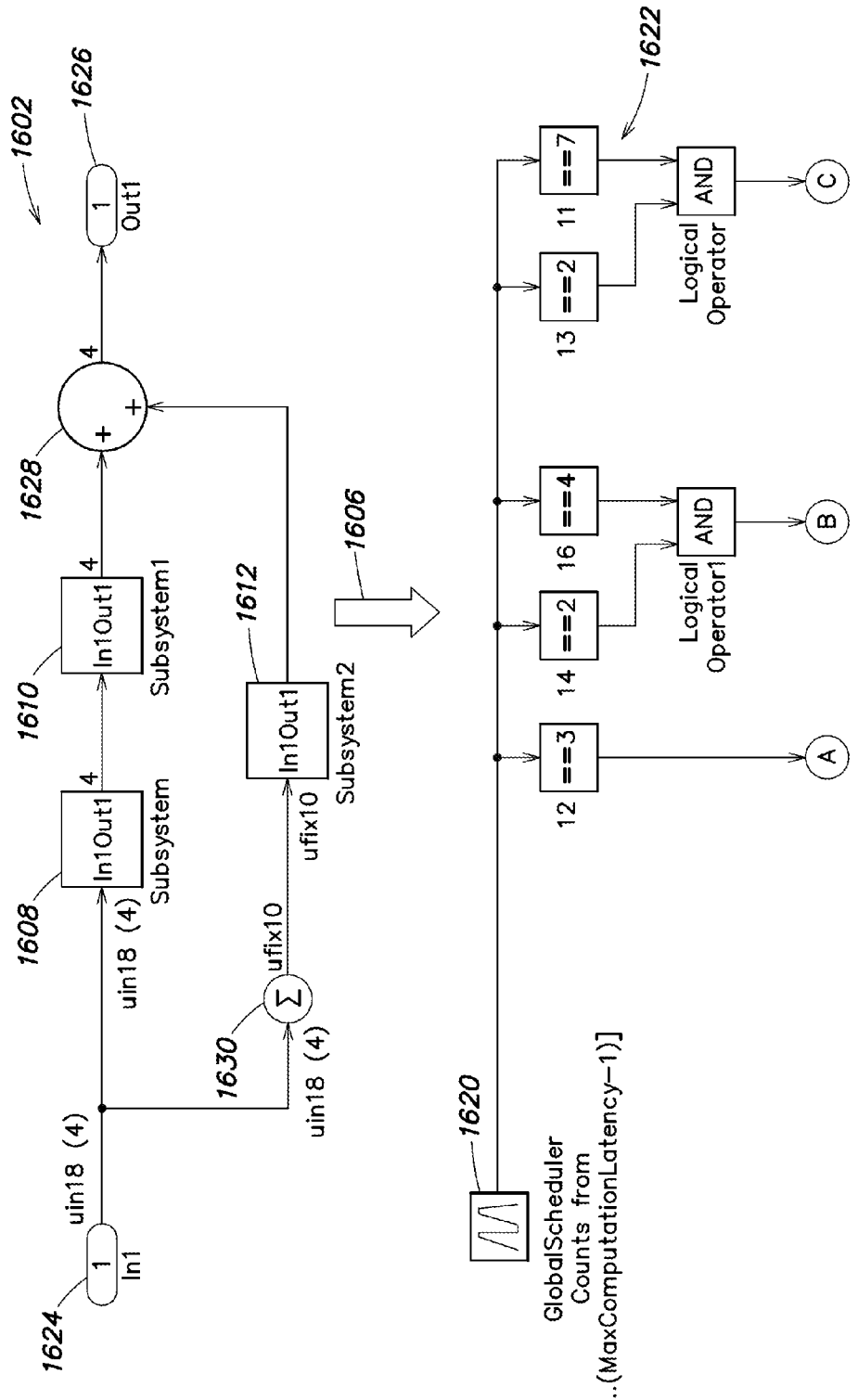
FIGS. 16A and 16B are partial views of a schematic illustration of an original source model being converted to an optimized model in accordance with embodiments of the present disclosure.
Figure 16B:
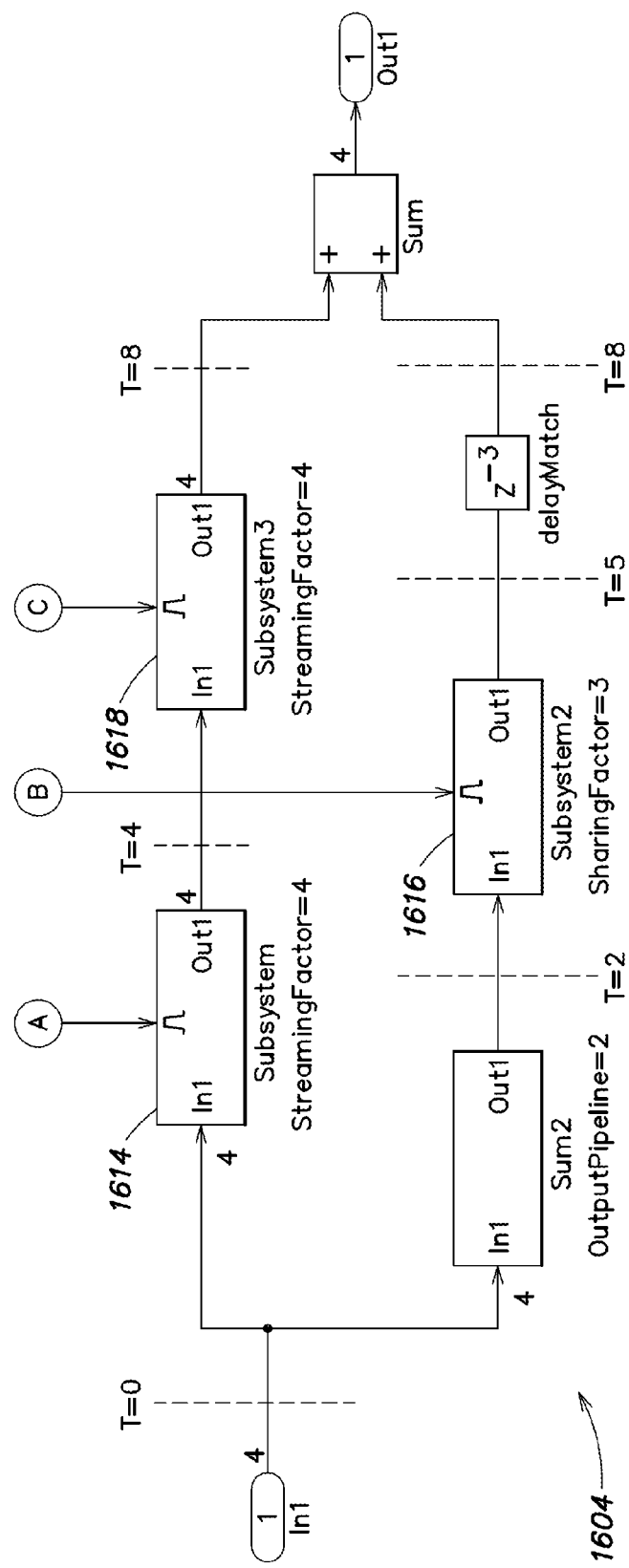

FIG. 16 is a schematic illustration of an original source model 1602 being converted to an optimized model 1604, as illustrated by arrow 1606. The original source model 1602 includes three subsystems, Subsystem 1608, Subsystem1 1610, and Subsystem2 1612. It may also include an Inport (In1) 1624, an Outport (Out1) 1626, a Sum block 1628, and a Summation block 1630. In the optimized model 1604, the three subsystems 1608, 1610, 1612 of the source model 1602 are converted to enabled subsystems 1614, 1616, and 1618. In addition, the optimized model includes a global counter 1620 and enable logic 1622 that connects the global counter 1620 to the enabled subsystems 1614, 1616, and 1618.

Synchronous Architecture

In some embodiments, the optimization engine 228 may be configured to create optimized subsystems, e.g., subsystems employing sharing and/or streaming, that run in sync with the Max Computation Latency rate. When Max Computation Latency is greater than the Sharing factor, for example, input side multiplexors may be provided to the subsystem being optimized that inject a selected value, e.g., zeros, into the subsystem during unused cycles, e.g., when T>(Max Computation Latency)−(Sharing factor). On the output side of the subsystem, demultiplexors may be added that discard, e.g., throw away, values, e.g., samples, computed during the unused cycles.

The foregoing description of embodiments is intended to provide illustration and description, but is not intended to be exhaustive or to limit the disclosure to the precise form disclosed. Modifications and variations are possible in light of the above teachings or may be acquired from practice of the disclosure. For example, while a series of acts has been described above with respect to FIGS. 4A-4C, 7A-7B, 11, and 12, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the disclosure. Thus, the operation and behavior of embodiments were described without reference to the specific software code and/or specialized hardware—it being understood that one would be able to design software and/or hardware to implement the embodiments based on the description herein.

Further, certain embodiments of the disclosure may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as CPU 102. The computer-executable instructions may include instructions that implement one or more embodiments of the disclosure. The tangible computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving an executable, source graphical model configured to execute over a plurality of model steps, the executable, source graphical model including at least one subsystem including data paths, the data paths including a plurality of blocks;
   generating an in-memory representation of the executable, source graphical model, the in-memory representation including a portion that corresponds to the at least one subsystem, the portion of the in-memory representation including a plurality of functional components that correspond to the blocks of the data paths;
   searching the portion of the in-memory representation corresponding to the at least one subsystem to identify a set of functional components that are functionally equivalent;
   modifying the in-memory representation of the executable, source graphical model automatically, by a processing element, to create a modified in-memory representation, the modifying including:

replacing the set of functional components that are functionally equivalent with a single shared component,
configuring the portion of the in-memory representation with conditional execution control,
providing a counter, and
connecting the counter to the conditional execution control through one or more logic blocks to configure the portion of the in-memory representation to execute at determined ones of the plurality of model steps; and
generating from the modified in-memory representation one or more of an executable validation graphical model, a report, source code, and a hardware description.

2. The method of claim 1 wherein the portion of the in-memory representation operates at a clock rate that corresponds to the plurality of model steps over which the executable, source graphical model executes.

3. The method of claim 1 further comprising:
determining the ones of the plurality of model steps when the at least one subsystem is to be enabled.

4. The method of claim 3 further comprising:
receiving a maximum computation latency that specifies a number of time steps for which inputs of the executable, source graphical model are to remain stable;
determining a scheduled start time for the portion of the in-memory representation; and
determining a scheduled stop time for the portion of the in-memory representation,
where the determining the ones of the plurality of model steps includes:
applying a modulo operation to the scheduled start time and to the scheduled stop time utilizing the maximum computation latency.

5. The method of claim 1 wherein the modifying further includes:
inserting at least one data unbuffer component into the portion of the in-memory representation; and
connecting the at least one data unbuffer component to the single shared component.

6. The method of claim 1 wherein the modifying further includes:
inserting at least one hardware demultiplexor component into the portion of the in-memory representation; and
connecting the at least one hardware demultiplexor component to the single shared component.

7. A non-transitory computer-readable medium comprising program instructions, the program instructions when executed by a processing element operable to:
receive an executable, source graphical model configured to execute over a plurality of model steps, the executable, source graphical model including at least one subsystem including data paths, the data paths including a plurality of blocks;
generate an in-memory representation of the executable, source graphical model, the in-memory representation including a portion that corresponds to the at least one subsystem, the portion of the in-memory representation including a plurality of functional components that correspond to the blocks of the data paths;
search the portion of the in-memory representation corresponding to the at least one subsystem to identify a set of functional components that are functionally equivalent;
modify the in-memory representation of the executable, source graphical model automatically, by a processing element, to create a modified in-memory representation, the program instructions to modify including program instructions to:
replace the set of functional components that are functionally equivalent with a single shared component,
configure the portion of the in-memory representation with conditional execution control,
provide a counter, and
connect the counter to the conditional execution control through one or more logic blocks to configure the portion of the in-memory representation to execute at determined ones of the plurality of model steps; and
generate from the modified in-memory representation one or more of an executable validation graphical model, a report, source code, and a hardware description.

8. The non-transitory computer-readable medium of claim 7 wherein the portion of the in-memory representation operates at a clock rate that corresponds to the plurality of model steps over which the executable, source graphical model executes.

9. The non-transitory computer-readable medium of claim 7 wherein the program instructions further comprise program instructions to:
determine the ones of the plurality of model steps when the at least one subsystem is to be enabled.

10. The non-transitory computer-readable medium of claim 9 wherein the program instructions further comprise program instructions to:
receive a maximum computation latency that specifies a number of time steps for which inputs of the executable, source graphical model are to remain stable;
determine a scheduled start time for the portion of the in-memory representation; and
determine a scheduled stop time for the portion of the in-memory representation,
where the program instructions to determine the ones of the plurality of model steps include program instructions to:
apply a modulo operation to the scheduled start time and to the scheduled stop time utilizing the maximum computation latency.

11. The non-transitory computer-readable medium of claim 7 wherein the program instructions to modify further include program instructions to:
insert at least one data unbuffer component into the portion of the in-memory representation; and
connect the at least one data unbuffer component to the single shared component.

12. The non-transitory computer-readable medium of claim 7 wherein the program instructions to modify further include program instructions to:
insert at least one hardware demultiplexor component into the portion of the in-memory representation; and
connect the at least one hardware demultiplexor component to the single shared component.

13. A non-transitory computer-readable medium comprising program instructions, the program instructions when executed by a processing element operable to:
receive a source graphical model including execution semantics, the source graphical model executing over a plurality of time steps and including a subsystem including a plurality of data paths, the plurality of data paths having a data width;
generate an in-memory representation of the source graphical model, the in-memory representation including a portion that corresponds to the subsystem;

modify the in-memory representation of the source graphical model to create a modified in-memory representation, the modifying including:
reducing the data width of at least one of the data paths;
inserting at least one data unbuffer component into the portion of the in-memory representation,
inserting at least one hardware demultiplexor component into the portion of the in-memory representation,
connecting the at least one data unbuffer component and the at least one hardware demultiplexor component to the at least one of the data paths,
configuring the portion of the in-memory representation with conditional execution control,
providing a counter, and
connecting the counter to the conditional execution control through control logic so that the portion of the in-memory representation executes at determined time steps; and
generate from the modified in-memory representation one or more of an executable validation graphical model, a report, source code, and a hardware description.

14. An apparatus comprising:
a memory storing an executable, source graphical model configured to execute over a plurality of model steps, the executable, source graphical model including at least one subsystem including data paths, the data paths including a plurality of blocks;
a processor coupled to the memory, the processor configured to:
generate an in-memory representation of the executable, source graphical model, the in-memory representation including a portion that corresponds to the at least one subsystem, the portion of the in-memory representation including a plurality of functional components that correspond to the blocks of the data paths;
search the portion of the in-memory representation corresponding to the at least one subsystem to identify a set of functional components that are functionally equivalent;
modify the in-memory representation of the executable, source graphical model automatically to create a modified in-memory representation, the modify including:
replace the set of functional components that are functionally equivalent with a single shared component,
configure the portion of the in-memory representation with conditional execution control,
provide a counter, and
connect the counter to the conditional execution control through one or more logic blocks to configure the portion of the in-memory representation to execute at determined ones of the plurality of model steps; and
generate from the modified in-memory representation one or more of an executable validation graphical model, a report, source code, and a hardware description.

15. The apparatus of claim 14 wherein the portion of the in-memory representation operates at a clock rate that corresponds to the plurality of model steps over which the executable, source graphical model executes.

16. The apparatus of claim 14 wherein the processor is further configured to:
determine the ones of the plurality of model steps when the at least one subsystem is to be enabled.

17. The apparatus of claim 16 wherein the processor is further configured to:
receive a maximum computation latency that specifies a number of time steps for which inputs of the executable, source graphical model are to remain stable;
determine a scheduled start time for the portion of the in-memory representation; and
determine a scheduled stop time for the portion of the in-memory representation,
where the processor, when performing the determine the ones of the plurality of model steps when the at least one subsystem is to be enabled, is further configured to apply a modulo operation to the scheduled start time and to the scheduled stop time utilizing the maximum computation latency.

18. The apparatus of claim 14 where the processor, when performing the modify, is further configured to:
insert at least one data unbuffer component into the portion of the in-memory representation; and
connect the at least one data unbuffer component to the single shared component.

19. The apparatus of claim 14 wherein the processor is further configured to:
insert at least one hardware demultiplexor component into the portion of the in-memory representation; and
connect the at least one hardware demultiplexor component to the single shared component.

* * * * *